US012672141B2

(12) United States Patent
Zhang

(10) Patent No.: US 12,672,141 B2
(45) Date of Patent: Jun. 30, 2026

(54) COMMUNICATION METHOD AND APPARATUS

(71) Applicant: HUAWEI TECHNOLOGIES CO., LTD., Shenzhen (CN)

(72) Inventor: Lili Zhang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 557 days.

(21) Appl. No.: 17/967,613

(22) Filed: Oct. 17, 2022

(65) Prior Publication Data

US 2023/0030664 A1 Feb. 2, 2023

Related U.S. Application Data

(63) Continuation of application No. PCT/CN2021/087920, filed on Apr. 16, 2021.

(30) Foreign Application Priority Data

Apr. 17, 2020 (CN) ......................... 202010307233.1

(51) Int. Cl.
| | |
|---|---|
| *H04W 72/20* | (2023.01) |
| *H04W 72/0446* | (2023.01) |
| *H04W 76/28* | (2018.01) |

(52) U.S. Cl.
CPC ....... *H04W 72/20* (2023.01); *H04W 72/0446* (2013.01); *H04W 76/28* (2018.02)

(58) Field of Classification Search
CPC . H04W 72/20; H04W 72/0446; H04W 76/28; H04W 72/40; H04W 72/0453;
(Continued)

(56) References Cited

U.S. PATENT DOCUMENTS

| | | |
|---|---|---|
| 2018/0220366 A1 | 8/2018 | Bergström et al. |
| 2019/0098689 A1 | 3/2019 | Wei et al. |

(Continued)

FOREIGN PATENT DOCUMENTS

| | | |
|---|---|---|
| CN | 102843763 A | 12/2012 |
| CN | 106612561 A | 5/2017 |

(Continued)

OTHER PUBLICATIONS

"Introduction of additional enhancements for NB-Iot," 3GPP TSG-RAN WG2 Meeting #109-e, Electronic meeting, R2-2001787, Total 33 pages, 3rd Generation Partnership Project, Valbonne, France (Feb. 24-Mar. 6, 2020).

(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

A communication method and apparatus are provided which relate to the field of communication technologies, to achieve a manner of setting a duration value of a timer in sidelink communication. The method includes: a first terminal receives sidelink control information (SCI) from a second terminal, wherein the SCI indicates a sidelink time domain resource. The first terminal determines a first duration value of a first timer. The first duration value belongs to a duration value set configured for a resource pool or a duration value set configured for a sidelink, and the duration value set includes at least one duration value. The first terminal starts the first timer at a first moment, and monitors sidelink control information and/or sidelink data information in at least one time unit within the first duration value.

16 Claims, 16 Drawing Sheets

(58) Field of Classification Search
CPC ... H04L 5/0044; H04L 5/0053; H04L 5/0078; H04L 5/0094; H04L 5/0048; Y02D 30/70
USPC ........................................................ 370/336
See application file for complete search history.

(56) References Cited

U.S. PATENT DOCUMENTS

| | | | | |
|---|---|---|---|---|
| 2020/0029318 A1* | 1/2020 | Guo | ...................... | H04L 5/0055 |
| 2021/0007096 A1* | 1/2021 | Huang | .................. | H04L 1/1887 |
| 2021/0136783 A1* | 5/2021 | Fakoorian | ............. | H04W 76/14 |
| 2021/0227621 A1* | 7/2021 | Pan | ................... | H04W 72/0446 |
| 2021/0227622 A1* | 7/2021 | Kung | .................... | H04W 76/28 |
| 2021/0243749 A1* | 8/2021 | Hoang | ................. | H04W 24/08 |
| 2021/0282173 A1* | 9/2021 | Wang | .................... | H04W 72/23 |

FOREIGN PATENT DOCUMENTS

| | | |
|---|---|---|
| CN | 110392380 A | 10/2019 |
| CN | 110505703 A | 11/2019 |
| CN | 110839226 A | 2/2020 |
| CN | 110912653 A | 3/2020 |
| WO | 2020064710 A1 | 4/2020 |

OTHER PUBLICATIONS

"3rd Generation Partnership Project; Technical Specification Group Services and System Aspects; Architecture enhancements for 5G System (5GS) to support Vehicle-to-Everything (V2X) services (Release 16)," 3GPP TS 23.287 V16.4.0, pp. 1-58, 3rd Generation Partnership Project, Valbonne, France (Sep. 2020).

"3rd Generation Partnership Project; Technical Specification Group Radio Access Network; Evolved Universal Terrestrial Radio Access (E-UTRA); Radio Resource Control (RRC); Protocol specification (Release 16)," 3GPP TS 36.331 V16.0.0, pp. 1-1048, 3rd Generation Partnership Project, Valbonne, France (Mar. 2020).

"3rd Generation Partnership Project; Technical Specification Group Radio Access Network; NR; Physical channels and modulation (Release 16)," 3GPP TS 38.211 V16.1.0, pp. 1-130, 3rd Generation Partnership Project, Valbonne, France (Mar. 2020).

"3rd Generation Partnership Project; Technical Specification Group Radio Access Network; NR; Physical channels and modulation (Release 16)," 3GPP TS 38.211 V16.5.0, pp. 1-134, 3rd Generation Partnership Project, Valbonne, France (Mar. 2021).

"3rd Generation Partnership Project; Technical Specification Group Radio Access Network; NR; Multiplexing and channel coding (Release 16)," 3GPP TS 38.212 V16.1.0, pp. 1-146, 3rd Generation Partnership Project, Valbonne, France (Mar. 2020).

"3rd Generation Partnership Project; Technical Specification Group Radio Access Network; NR; Physical layer procedures for control (Release 16)," 3GPP TS 38.213 V16.1.0, pp. 1-156, 3rd Generation Partnership Project, Valbonne, France (Mar. 2020).

"3rd Generation Partnership Project; Technical Specification Group Radio Access Network; NR; Physical layer procedures for data (Release 16)," 3GPP TS 38.214 V16.1.0, pp. 1-151, 3rd Generation Partnership Project, Valbonne, France (Mar. 2020).

"3rd Generation Partnership Project; Technical Specification Group Radio Access Network; NR; Medium Access Control (MAC) protocol specification (Release 16)," 3GPP TS 38.321 V16.0.0, pp. 1-141, 3rd Generation Partnership Project, Valbonne, France (Mar. 2020).

"3rd Generation Partnership Project; Technical Specification Group Radio Access Network; NR; Radio Resource Control (RRC) protocol specification (Release 16)," 3GPP TS 38.331 V16.0.0, pp. 1-835, 3rd Generation Partnership Project, Valbonne, France (Mar. 2020).

* cited by examiner

Time domain
resource

Discontinuous
reception DRX

First duration value

Period T

Time

Communication apparatus 800

Communication apparatus 900

COMMUNICATION METHOD AND APPARATUS

CROSS-REFERENCE TO RELATED APPLICATIONS

This application is a continuation of International Application No. PCT/CN2021/087920, filed on Apr. 16, 2021, which claims priority to Chinese Patent Application No. 202010307233.1, filed on Apr. 17, 2020. The disclosures of the aforementioned applications are incorporated herein by reference in their entireties.

TECHNICAL FIELD

Embodiments of this application relate to the field of communication technologies, and in particular, to a communication method and apparatus.

BACKGROUND

On a sidelink, in consideration of energy saving of a terminal, a discontinuous reception (DRX) mechanism may be introduced. The DRX mechanism is to configure a DRX cycle for a terminal in a radio resource control (RRC) connected mode. The DRX cycle includes an active time and a sleep time. During the active time, the terminal monitors and receives data on a physical downlink control channel (PDCCH). During the sleep time, the terminal no longer monitors the data on a PDCCH to reduce power consumption.

Generally, after a terminal is scheduled in a subframe and receives data or sends data, it is likely that the terminal continues to be scheduled in next several subframes. If data is received or data is sent when an active time in a next DRX cycle arrives, a transmission delay is caused. To reduce such delay, a timer (drx-Inactivity Timer) is configured for the terminal. Each time the terminal is scheduled to initially transmit data (initial transmission rather than retransmission), the timer (drx-Inactivity Timer) is started or restarted, and the terminal stays in an active state. To be specific, the terminal receives data or sends data until the timer expires. The drx-Inactivity Timer specifies a quantity of consecutive subframes that remains in the active state after the terminal successfully decodes uplink or downlink data that indicates initial transmission.

Sidelink data transmission is scheduled on the sidelink by using sidelink control information (SCI). In sidelink communication, how to set a duration value of a timer (drx–Inactivity Timer) is a technical problem that needs to be resolved.

SUMMARY

Embodiments of this application provide a communication method and apparatus, to provide a manner of setting a duration value of a timer in sidelink communication.

According to a first aspect, a communication method is provided. A first terminal may receive sidelink control information SCI from a second terminal, where the SCI indicates a sidelink time domain resource. The first terminal may determine a first duration value of a first timer. The first duration value may belong to a duration value set configured for a resource pool or a duration value set configured for a sidelink, and the duration value set includes at least one duration value. Alternatively, the first duration value may be determined based on discontinuous reception DRX configuration information of the first terminal and/or a time domain resource indicated by the SCI. Further, the first terminal starts or restarts the first timer at a first moment, and monitors sidelink control information and/or sidelink data information in at least one time unit within a first duration value of the first timer.

In addition, the first terminal may receive the sidelink control information SCI from the second terminal, where the SCI indicates a sidelink time domain resource. Further, the first terminal determines the first duration value of the first timer. The first terminal starts or restarts the first timer at the first moment, and monitors sidelink control information and/or sidelink data information in at least one time unit within the first duration value.

In addition, the first terminal may receive the sidelink control information SCI from the second terminal, where the SCI indicates a sidelink time domain resource. Further, the first terminal starts or restarts the first timer at a first moment, and monitors sidelink control information and/or sidelink data information in at least one time unit within a first duration value of the first timer.

In a possible example, the first terminal may determine a first duration value of a first timer. The first duration value may belong to a duration value set configured for a resource pool or a duration value set configured for a sidelink, and the duration value set includes at least one duration value. Alternatively, the first duration value may be determined based on discontinuous reception DRX configuration information of the first terminal and/or a time domain resource indicated by the SCI. Alternatively, the first duration value is received from a network device. Alternatively, the first duration value is received from the second terminal.

The duration value set configured for a sidelink may be configured for different resource pools. Therefore, when the resource pool carries a corresponding service, a corresponding timer duration value may be applicable, to ensure that sidelink data can be correctly received while saving energy. In an example, the resource pool carries a service corresponding to quality of service (QoS) or a feedback mechanism is enabled. Therefore, a corresponding timer duration value may be service-specific.

The duration value set configured for a sidelink may be configured for different service features. Therefore, when the sidelink carries a corresponding service, a corresponding timer duration value may be applicable, to ensure that sidelink data can be correctly received while saving energy. In an example, when the sidelink carries a unicast service, a multicast service, or a broadcast service, or a service corresponding to QoS, or a feedback mechanism is enabled, a corresponding timer duration value may be service-specific.

There is a clear time relationship between a physical downlink control channel PDCCH on a Uu interface and a physical downlink shared channel (PDSCH). The PDCCH is located in first several symbols, the PDSCH is located in following symbols, and the first timer is started after the PDCCH. In this application, a moment at which the first terminal starts the first timer on the sidelink is specified, so that the first terminal starts the timer in time, and monitors possible data transmission or sidelink data transmission in an active time. Different from the PDCCH and the PDSCH on the Uu interface, the SCI on the sidelink and scheduled data do not have a clear time relationship. In addition, it is clarified that the first duration value on the sidelink is set based on the received duration value configured for the sidelink. Therefore, a time length that is in the active time and that is specifically configured for the sidelink based on a sidelink service can be considered, to match an actual service scheduling requirement. Alternatively, the first duration value on the sidelink is set based on a time domain position of a time domain resource included in the SCI, or based on an overlapping status between the time domain resource included in the SCI and discontinuous reception DRX duration. This ensures that different data transmission resources are flexibly considered, and ensures that the terminal is in an active state at a moment at which data transmission may occur or at a moment at which data transmission is reserved, to match an actual service scheduling requirement.

In a possible implementation, the first terminal may further determine the first duration value of the first timer (the first timer may also be referred to as an inactivity timer). For example, the first terminal may determine a duration value in the duration value set as the first duration value. Alternatively, the first terminal may determine the first duration value based on the discontinuous reception configuration information of the first terminal and/or the time domain resource indicated by the SCI. Alternatively, the first terminal may receive the first duration value from the second terminal. Alternatively, the first terminal may receive the first duration value from the network device. The second terminal or the network device may determine a duration value in the duration value set as the first duration value, and then send the first duration value to the first terminal. The second terminal may alternatively determine the first duration value based on the discontinuous reception configuration information of the first terminal and/or the time domain resource indicated by the SCI, and then send the first duration value to the first terminal.

In a possible implementation, when the first terminal determines the first duration value based on the discontinuous reception configuration information of the first terminal and/or the sidelink time domain resource indicated by the SCI, the method may include but is not limited to at least one of the following: The first terminal determines the first duration value based on the discontinuous reception configuration information of the first terminal and/or the time domain position of the sidelink time domain resource indicated by the SCI. The first terminal determines the first duration value based on whether the discontinuous reception configuration information of the first terminal completely overlaps with the sidelink time domain resource indicated by the SCI. The first terminal determines the first duration value based on a degree of overlapping between the discontinuous reception configuration information of the first terminal and the sidelink time domain resource indicated by the SCI.

In a possible implementation, when the first terminal determines the first duration value based on the discontinuous reception configuration information of the first terminal and/or the sidelink time domain resource indicated by the SCI, the first terminal may determine the first duration value based on a discontinuous reception active time of the first terminal and/or the sidelink time domain resource indicated by the SCI.

In a possible implementation, when the first terminal determines the first duration value based on the discontinuous reception active time of the first terminal and/or the sidelink time domain resource indicated by the SCI, the method may include but is not limited to at least one of the following: The first terminal determines the first duration value based on the discontinuous reception active time of the first terminal and/or the time domain position of the sidelink time domain resource indicated by the SC. The first terminal determines the first duration value based on whether the discontinuous reception active time of the first terminal overlaps with the sidelink time domain resource indicated by the SC. The first terminal determines the first duration value based on a degree of overlapping between the discontinuous reception active time of the first terminal and the sidelink time domain resource indicated by the SCI.

In a possible implementation, the degree of overlapping may include but is not limited to at least one of the following: The time domain resource is completely located in the discontinuous reception active time of the first terminal, at least first m symbols of the time domain resource are located in the discontinuous reception active time of the first terminal, or an overlapping part between the time domain resource and the discontinuous reception active time of the first terminal does not include the at least first m symbols of the time domain resource.

In a possible implementation, the first moment includes but is not limited to any one of the following: a start symbol of the SCI, a next symbol following the start symbol of the SCI, an end symbol of the SCI, a next symbol following the end symbol of the SCI, a start symbol of a first time domain resource indicated by the SCI, a next symbol following the start symbol of the first time domain resource indicated by the SCI, an end symbol of the first time domain resource indicated by the SCI, a next symbol following the end symbol of the first time domain resource indicated by the SCI, an end symbol of a slot in which the SCI is located, a next symbol following the end symbol of the slot in which the SCI is located, an end point of the end symbol of the slot in which the SCI is located, a start point of the next symbol following the end symbol of the slot in which the SCI is located, following the end symbol of the slot in which the SCI is located, or a next slot after the slot in which the SCI is located. When the SCI received by the first terminal is first-level SCI, the foregoing SCI for describing the first moment may be replaced with first-level SCI.

In a possible implementation, the end symbol of the slot in which the SCI is located may be the end point of the end symbol of the slot in which the SCI is located. The next symbol following the end symbol of the slot in which the SCI is located may be a start point of the next symbol following the end symbol of the slot in which the SCI is located, or may be following the end symbol of the slot in which the SCI is located.

An advantage of starting the timer from a next slot includes: The first terminal has detected the SCI, and therefore data of a sidelink currently indicated or currently scheduled by the SCI can be detected (or the first terminal can perform detection based on this). In an implementation, the data of a sidelink currently scheduled is located in the same slot as that in which the SCI is located. Therefore, the first terminal does not need to start the first timer on any symbol of the current slot, to ensure correct receiving of the currently scheduled data. The first terminal only needs to start the first timer in a next slot, so that the first terminal is in the active time or the active state, thereby ensuring detection of data that may be scheduled subsequently.

It may also be understood that when the first terminal detects the SCI, the service from the second terminal to the first terminal is activated. The first terminal may detect the data of a sidelink currently indicated or currently schedule based on the currently detected SCI. However, for subsequent service data, the first timer needs to be started in a next slot, to ensure that subsequent SCI can be correctly detected, or in other words, no SCI is missed.

Therefore, in conclusion, when a service from the second terminal to the first terminal is unicast, and the first timer is started in a next slot, this ensures that effective energy saving is achieved during a DRX working period, SCI of the unicast service pair is not missed, service transmission for the unicast service pair can be completed, and QoS is improved. When a service from the second terminal to the first terminal is multicast, and the first timer is started in a next slot, this ensures that effective energy saving is achieved during a DRX working period, SCI of the multicast service pair is not missed, service transmission for the multicast service pair can be completed, and QoS is improved.

This advantage is also applicable to the following case in which SCI is classified into first-level SCI and second-level SCI.

In a possible implementation, the SCI received by the first terminal may include first-level SCI and second-level SCI, and the first moment is any one of the following: a start symbol of the first-level SCI or a start symbol of the second-level SCI, a next symbol following the start symbol of the first-level SCI or a next symbol following the start symbol of the second-level SCI, an end symbol of the first-level SCI or an end symbol of the second-level SCI, a next symbol following the end symbol of the first-level SCI or a next symbol following the end symbol of the second-level SCI, a start symbol of the first time domain resource indicated by the first-level SCI, a next symbol following the start symbol of the first time domain resource indicated by the first-level SCI, an end symbol of the first time domain resource indicated by the first-level SCI, a next symbol following the end symbol of the first time domain resource indicated by the first-level SCI, an end symbol of a slot in which the first-level SCI and the second-level SCI are located, a next symbol following the end symbol of the slot in which the first-level SCI and the second-level SCI are located, an end point of the end symbol of the slot in which the first-level SCI and the second-level SCI are located, a start point of the next symbol following the end symbol of the slot in which the first-level SCI and the second-level SCI are located, following the end symbol of the slot in which the first-level SCI and the second-level SCI are located, or a next slot after the slot in which the first-level SCI and the second-level SCI are located. The SCI may be further classified into first-level SCI and second-level SCI. Therefore, a time relationship between a moment of starting the first timer and the first-level SCI and/or the second-level SCI, and a time relationship between the moment of starting the first timer and the first time domain resource indicated by the first-level SCI need to be clarified.

In a possible implementation, the end symbol of the slot in which the first-level SCI and the second-level SCI are located may be the end point of the end symbol of the slot in which the first-level SCI and the second-level SCI are located. The next symbol following the end symbol of the slot in which the first-level SCI and the second-level SCI are located may be the start point of the next symbol following the end symbol of the slot in which the first-level SCI and the second-level SCI are located, or may be following the end symbol of the slot in which the first-level SCI and the second-level SCI are located.

In a possible implementation, the discontinuous reception DRX configuration information includes but is not limited to at least one of the following: a discontinuous reception DRX start offset, a discontinuous reception DRX active time, a discontinuous reception DRX cycle length, a discontinuous reception DRX pattern, and a discontinuous reception DRX pattern index. The discontinuous reception DRX active time may also be referred to as duration.

In a possible implementation, the sidelink time domain resource indicated by the SCI may include a first resource set, where the first resource set includes N sidelink time domain resources, and N is a positive integer; or a second resource set, where the second resource set includes a periodic first resource set, the first resource set includes N sidelink time domain resources, and N is a positive integer. It may also be understood that the second resource set includes at least two first resource sets.

In a possible implementation, the first resource set includes one or more time domain resources. When N is 1, the first resource set includes one time domain resource. When N is an integer greater than 1, the first resource set includes a plurality of time domain resources.

In a possible implementation, when the first duration value is determined based on the discontinuous reception DRX configuration information of the first terminal and/or the time domain resource indicated by the SCI, the first duration value may be determined based on a difference between a second moment and a third moment.

The second moment includes but is not limited to any one of the following: a start symbol of the SCI, a next symbol following the start symbol of the SCI, an end symbol of the SCI, a next symbol following the end symbol of the SCI, a start symbol of the first time domain resource indicated by the SCI, a next symbol following the start symbol of the first time domain resource indicated by the SCI, an end symbol of the first time domain resource indicated by the SCI, or a next symbol following the end symbol of the first time domain resource indicated by the SCI. The first moment and the second moment may be the same or different.

The third moment includes but is not limited to any one of the following: a start symbol of an $x^{th}$ time domain resource in the first resource set indicated by the SCI, a next symbol following the start symbol of the $x^{th}$ time domain resource in the first resource set indicated by the SCI, an end symbol of the $x^{th}$ time domain resource in the first resource set indicated by the SCI, a next symbol following the end symbol of the $x^{th}$ time domain resource in the first resource set indicated by the SCI, a start symbol of an $x^{th}$ time domain resource in a $y^{th}$ first resource set in the second resource set indicated by the SCI, a next symbol following the start symbol of the $x^{th}$ time domain resource in the $y^{th}$ first resource set in the second resource set indicated by the SCI, an end symbol of the $x^{th}$ time domain resource in the $y^{th}$ first resource set in the second resource set indicated by the SCI, or a next symbol following the end symbol of the $x^{th}$ time domain resource in the $y^{th}$ first resource set in the second resource set indicated by the SCI, where y is an integer greater than or equal to 1, x is an integer greater than or equal to 1, and x is an integer less than or equal to n.

In a possible implementation, the SCI is first-level SCI or the SCI includes first-level SCI and second-level SCI.

In a possible implementation, when the SCI includes first-level SCI and second-level SCI, the first duration value may still be determined based on a difference between the third moment and the second moment.

In this case, the second moment is any one of the following: a start symbol of the first-level SCI or a start symbol of the second-level SCI, a next symbol following the start symbol of the first-level SCI or a next symbol following the start symbol of the second-level SCI, an end symbol of the first-level SCI or an end symbol of the second-level SCI, a next symbol following the end symbol of the first-level SCI or a next symbol following the end symbol of the second-level SCI, a start symbol of the first time domain resource indicated by the first-level SCI, a next symbol following the start symbol of the first time domain resource indicated by the first-level SCI, an end symbol of the first time domain resource indicated by the first-level SCI, or a next symbol following the end symbol of the first time domain resource indicated by the first-level SCI.

In this case, the third moment is any one of the following: a start symbol of an $x^{th}$ time domain resource in the first resource set indicated by the first-level SCI, a next symbol following the start symbol of the $x^{th}$ time domain resource in the first resource set indicated by the first-level SCI, an end symbol of the $x^{th}$ time domain resource in the first resource set indicated by the first-level SCI, a next symbol following the end symbol of the $x^{th}$ time domain resource in the first resource set indicated by the first-level SCI, a start symbol of an $x^{th}$ time domain resource in a $y^{th}$ first resource set in the second resource set indicated by the first-level SCI, a next symbol following the start symbol of the $x^{th}$ time domain resource in the $y^{th}$ first resource set in the second resource set indicated by the first-level SCI, an end symbol of the $x^{th}$ time domain resource in the $y^{th}$ first resource set in the second resource set indicated by the first-level SCI, or a next symbol following the end symbol of the $x^{th}$ time domain resource in the $y^{th}$ first resource set in the second resource set indicated by the first-level SCI.

In a possible implementation, when the first duration value is determined based on a difference between the third moment and the second moment, the difference between the third moment and the second moment may be determined as the first duration value, a sum of the difference between the third moment and the second moment and a first parameter is determined as the first duration value, or a minimum quantity of slots greater than or equal to the difference between the third moment and the second moment is determined as the first duration value.

In a possible implementation, the first parameter is duration of a time domain resource or an offset.

In a possible implementation, one or more duration values in the duration value set configured for a resource pool are associated with discontinuous reception duration or a discontinuous reception cycle length. Alternatively, one or more duration values in the duration value set configured for a sidelink are associated with discontinuous reception duration or a discontinuous reception cycle length. The first terminal, the second terminal, or the network device may determine the first duration value in the duration value set based on the discontinuous reception duration of the first terminal or the discontinuous reception cycle length.

In a possible implementation, the first duration value is a discontinuous duration value. For example, "discontinuous" means that the first duration value matches a corresponding time domain resource.

In a possible implementation, the first duration value matches a corresponding time domain resource. The corresponding time domain resource is a resource that is in the indicated time domain resource and that is used for initial data transmission.

When the SCI indicates that the second resource set is a periodic resource set, potential data transmission is performed on an indicated reserved periodic resource. Therefore, the first terminal should be in the active time on the at least periodic resource indicated by the SCI and a resource used for initial data transmission, to ensure that no potential SCI and/or data is missed. For non-initial transmission, another timer may be used for control, to ensure reliable data transmission.

The corresponding time domain resource is a first time domain resource in each second resource set in the indicated time domain resource.

When the SCI indicates that the second resource set is a periodic resource set, potential data transmission is performed on an indicated reserved periodic resource. Generally, the first time domain resource in each second resource set is used to initially transmit data. Therefore, the first terminal should be in the active time on the at least first time domain resource in each second resource set in the time domain resource indicated by the SCI, to ensure that no potential SCI and/or data is missed. For non-initial transmission, another timer may be used for control, to ensure reliable data transmission.

In a possible implementation, when the first terminal determines a duration value in the duration value set as the first duration value, the first terminal may determine a minimum duration value that is in the duration value set and that is greater than or equal to the difference between the third moment and the second moment as the first duration value.

In a possible implementation, the SCI indicates initially transmitted data or new data transmission.

In a possible implementation, the first terminal is in an active time in time domain occupied by the time domain resource indicated by the SCI, and/or the first terminal is in an inactive time in time domain not occupied by the time domain resource indicated by the SCI.

The SCI indicates the first resource set or the second resource set. In either case, potential data transmission is performed on an indicated reserved resource. Therefore, the first terminal should be in the active time on the resource indicated by the SCI, to ensure that no potential SCI and/or data is missed.

When the SCI indicates that the second resource set is a periodic resource set, potential data transmission is performed on an indicated reserved periodic resource. Therefore, the first terminal should be in the active time on the periodic resource indicated by the SCI, to ensure that no potential SCI and/or data is missed.

The SCI indicates the first resource set or the second resource set. No matter which mode is used, potential data transmission is performed on an indicated reserved resource, and no data transmission is performed on a resource that is not reserved. Therefore, to ensure effective energy saving, the first terminal should be in an inactive time in time domain not occupied by the time domain resource indicated by the SCI, thereby optimizing energy saving.

In a possible implementation, that the first terminal is in an active time in time domain occupied by the time domain resource indicated by the SCI includes: The first timer is timing. That the first terminal is in an inactive time in time domain not occupied by the time domain resource indicated by the SCI includes: The first timer pauses timing.

In a possible implementation, unicast service transmission or multicast service transmission is performed between the first terminal and the second terminal.

When the SCI is SCI from different second terminals, the first terminal separately determines a first timer or a first duration value of the first timer for the different second terminals. This case is usually applicable to a unicast service transmission scenario.

In a possible implementation, monitoring sidelink control information and/or sidelink data information in at least one time unit within a first duration value of the first timer may enable the first terminal to be in the active time in the sidelink time domain resource indicated by the SCI.

The SCI indicates a first resource set or a second resource set. In either case, potential data transmission is performed on an indicated reserved resource. Therefore, the first terminal should be in the active time on the resource indicated by the SCI, to ensure that no potential SCI and/or data is missed.

When the SCI indicates that the second resource set is a periodic resource set, potential data transmission is performed on an indicated reserved periodic resource. Therefore, the first terminal should be in the active time on the periodic resource indicated by the SCI, to ensure that no potential SCI and/or data is missed.

In a possible implementation, the first terminal is in the active time within the first duration value of the first timer.

In a possible implementation, at least one of N time domain resources in the first resource set is included in a DRX active time (for example, in a possible implementation, a first time domain resource in the N time domain resources in the first resource set is included in the DRX active time).

Alternatively, at least one of N time domain resources in the second resource set in the target period is included in the DRX active time (for example, a first time domain resource in the N time domain resources in the second resource set in the target period is included in the DRX active time).

First m symbols of at least one of N time domain resources in the second resource set in a target period overlap with the DRX active time.

Alternatively, a first time domain resource of the N time domain resources in the second resource set in a target period is included in the DRX active time, and N−1 time domain resources other than the first time domain resource overlap or do not overlap with the DRX active time, where N is an integer greater than or equal to 1.

In a possible implementation, the target period is at least one of first Y periods corresponding to the second resource set, and Y is an integer greater than or equal to 1.

Alternatively, the target period is at least one of Y periods corresponding to the second resource set, and Y is an integer greater than or equal to 1.

According to a second aspect, a communication method is provided. A second terminal sends sidelink control information SCI to a first terminal, where the SCI indicates one or more time domain resources.

In a possible implementation, the second terminal sends a first duration value to the first terminal. The first duration value may belong to a duration value set configured for a resource pool or a duration value set configured for a sidelink, and the duration value set includes at least one duration value. Alternatively, the first duration value may be determined based on discontinuous reception DRX configuration information of the first terminal and/or a time domain resource indicated by the SCI.

In a possible implementation, the second terminal may determine a duration value in the duration value set as the first duration value. Alternatively, the second terminal may determine the first duration value based on the discontinuous reception configuration information of the first terminal and/or the time domain resource indicated by the SCI.

In addition, a process in which the second terminal determines the first duration value based on the discontinuous reception configuration information of the first terminal and/or the time domain resource indicated by the SCI is the same as a process in which the first terminal determines the first duration value based on the discontinuous reception configuration information of the first terminal and/or the time domain resource indicated by the SCI described in any one of the first aspect and possible implementations of the first aspect. Refer to the description in any one of the first aspect and possible implementations of the first aspect. Details are not described herein again.

In addition, detailed descriptions of the SCI are the same as the descriptions of the SCI in any one of the first aspect and possible implementations of the first aspect. For details, refer to the descriptions in any one of the first aspect and possible implementations of the first aspect. Details are not described herein again.

For example, the SCI indicates initially transmitted data or new data transmission.

For example, the first terminal is in an active time in time domain occupied by the time domain resource indicated by the SCI, and/or the first terminal is in an inactive time in time domain not occupied by the time domain resource indicated by the SCI.

For example, that the first terminal is in an active time in time domain occupied by the time domain resource indicated by the SCI includes: The first timer is timing. That the first terminal is in an inactive time in time domain not occupied by the time domain resource indicated by the SCI includes: The first timer pauses timing.

In a possible implementation, unicast service transmission or multicast service transmission is performed between the first terminal and the second terminal.

When the SCI is SCI from different second terminals, the first terminal separately determines a first timer or a first duration value of the first timer for the different second terminals. This case is usually applicable to a unicast service transmission scenario.

According to a third aspect, a communication apparatus is provided. The communication has a function of implementing any one of the first aspect and possible implementations of the first aspect. The function may be implemented by hardware, or may be implemented by hardware executing corresponding software. The hardware or software includes one or more function modules corresponding to the foregoing function.

According to a fourth aspect, a communication apparatus is provided. The communication has a function of implementing any one of the second aspect and possible implementations of the second aspect. The function may be implemented by hardware, or may be implemented by hardware executing corresponding software. The hardware or software includes one or more function modules corresponding to the foregoing function.

According to a fifth aspect, a communication apparatus is provided. The apparatus may be the first terminal in the foregoing method embodiments, or a chip disposed in the first terminal. The apparatus includes a transceiver and a processor, and optionally, further includes a memory. The memory is configured to store a computer program or instructions. The processor is separately coupled to the memory and the transceiver. When the processor executes the computer program or the instructions, the apparatus is enabled to perform, by using the transceiver, the method that is in any one of the first aspect and possible implementations of the first aspect and that is performed by the first terminal.

According to a sixth aspect, a communication apparatus is provided. The apparatus may be the second terminal in the foregoing method embodiments, or a chip disposed in the second terminal. The apparatus includes a transceiver and a processor, and optionally, further includes a memory. The memory is configured to store a computer program or instructions. The processor is separately coupled to the memory and the transceiver. When the processor executes the computer program or the instructions, the apparatus is enabled to perform, by using the transceiver, the method that is in any one of the second aspect and possible implementations of the second aspect and that is performed by the second terminal.

According to a seventh aspect, a computer program product is provided. The computer program product includes computer program code. When the computer program code is run on a computer, the computer is enabled to perform the method performed by the first terminal in any one of the first aspect and possible implementations of the first aspect.

According to an eighth aspect, a computer program product is provided. The computer program product includes computer program code. When the computer program code is run on a computer, the computer is enabled to perform the method performed by the second terminal in any one of the second aspect and possible implementations of the second aspect.

According to a ninth aspect, this application provides a chip system. The chip system includes a processor and a memory. The processor is electrically coupled to the memory. The memory is configured to store computer program instructions. The processor is configured to execute some or all of the computer program instructions in the memory. When the some or all of the computer program instructions are executed, the processor is configured to implement functions of the first terminal according to the method in any one of the first aspect and possible implementations of the first aspect.

In a possible design, the chip system may further include a transceiver. The transceiver is configured to send a signal processed by the processor, or receive a signal input to the processor. The chip system may include a chip, or may include a chip and another discrete component.

According to a tenth aspect, this application provides a chip system. The chip system includes a processor and a memory. The processor is electrically coupled to the memory. The memory is configured to store computer program instructions. The processor is configured to execute some or all of the computer program instructions in the memory. When the some or all of the computer program instructions are executed, the processor is configured to implement functions of the second terminal according to the method in any one of the second aspect and possible implementations of the second aspect.

In a possible design, the chip system may further include a transceiver. The transceiver is configured to send a signal processed by the processor, or receive a signal input to the processor. The chip system may include a chip, or may include a chip and another discrete component.

According to an eleventh aspect, a computer-readable storage medium is provided. The computer-readable storage medium stores a computer program. When the computer program is run, the method performed by the first terminal according to any one of the first aspect and possible implementations of the first aspect is performed.

According to a twelfth aspect, a computer-readable storage medium is provided. The computer-readable storage medium stores a computer program. When the computer program is run, the method performed by the second terminal according to any one of the second aspect and possible implementations of the second aspect is performed.

According to a thirteenth aspect, a communication system is provided. The system includes the first terminal that performs the method in any one of the first aspect or possible implementations of the first aspect, and the second terminal that performs the method in any one of the second aspect or possible implementations of the second aspect.

Optionally, the communication system further includes a network device that performs the method in any one of the foregoing aspects and possible implementations of the aspects.

DESCRIPTION OF EMBODIMENTS

Figure 1A:
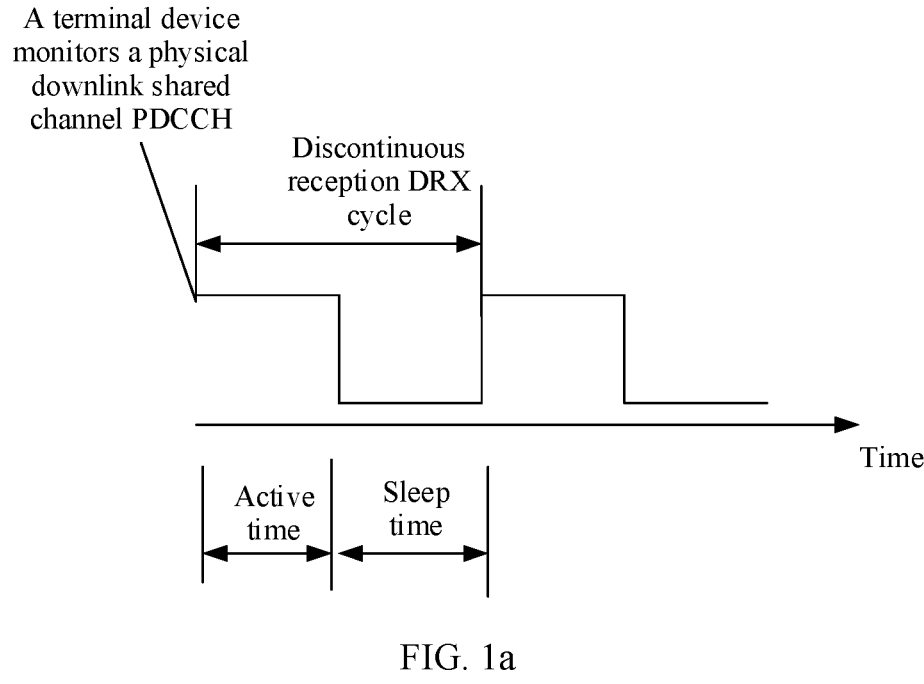
FIG. 1a is a schematic diagram of a DRX cycle according to an embodiment of this application.

The following describes in detail embodiments of this application with reference to accompanying drawings.

For ease of understanding embodiments of this application, the following describes a part of terms in embodiments of this application, to help a person skilled in the art have a better understanding.

The terminal is also referred to as user equipment (UE), a mobile station (MS), a mobile terminal (MT), or the like, and is a device that provides a user with voice and/or data connectivity. For example, the terminal device includes a handheld device, a vehicle-mounted device, an Internet-of-things device, or the like that has a wireless connection function. Currently, the terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot air balloon, an uncrewed aerial vehicle, or an airplane), or the like. In embodiments of this application, devices for implementing the foregoing functions are uniformly described by using a terminal as an example.

It should be understood that, in embodiments of this application, the terminal may alternatively be a chip in the terminal, or a communication apparatus, a unit, a module, or the like having a communication function between terminals, for example, a vehicle-mounted communication apparatus, a vehicle-mounted communication module, or a vehicle-mounted communication chip.

The term "and/or" in this application describes an association relationship between associated objects and indicates that three relationships may exist. For example, A and/or B may represent the following three cases: Only A exists, both A and B exist, and only B exists. The character "/" usually represents an "or" relationship between the associated objects.

"A plurality of" in this application means two or more.

In the descriptions of this application, terms such as "first" and "second" are only for distinction and description, but cannot be understood as indicating or implying relative importance, or as indicating or implying an order.

In addition, the word "example" in embodiments of this application is used to represent giving an example, an illustration, or a description. Any embodiment or implementation solution described as an "example" in this application should not be explained as being more preferred or having more advantages than another embodiment or implementation solution. Exactly, the word "example" is used to present a concept in a specific manner.

In this application, "greater than or equal to" may also be referred to as "greater than or equal to". In addition, "less than or equal to" may also be referred to as "less than or equal to".

Technical solutions in embodiments of this application may be applied to various communication systems, for example, a long term evolution (LTE) system, a worldwide interoperability for microwave access (WiMAX) communication system, a 5$^{th}$ generation (5G) system, such as a new radio access technology (NR), and a future communication system.

For ease of understanding embodiments of this application, the following describes application scenarios of this application. The service scenarios described in embodiments of this application are intended to describe the technical solutions in embodiments of this application more clearly, but constitutes no limitation on the technical solutions provided in embodiments of this application. A person of ordinary skill in the art may learn that the technical solutions provided in embodiments of this application are also applicable to a similar technical problem as a new service scenario emerges.

The technical solutions provided in this application may be used in a device-to-device (D2D) scenario, and optionally, may be used in a vehicle-to-everything (V2X) scenario. For example, D2D may be D2D in a long term evolution (LTE) communication system, may be D2D in a new radio (NR) communication system, or may be D2D in another communication system that may appear as technologies develop. Similarly, V2X may be LTE V2X or NR V2X, or may be V2X in another communication system that may appear as technologies develop. In a V2X communication architecture, data may be directly transmitted between terminals by using an SL.

For example, the V2X scenario may be specifically any one of the following systems: vehicle-to-vehicle (V2V) communication, vehicle-to-pedestrian (V2P) communication, a vehicle-to-network (V2N) service and vehicle-to-infrastructure (V2I) communication.

One participant of V2N is a terminal device, and the other participant is a service entity. V2N is currently the most widely used form of vehicle to everything, and a main function of V2N is to enable a vehicle to connect to a cloud server via a mobile network, to provide functions such as navigation, entertainment, and anti-theft through the cloud server.

Both participants of V2V are terminal devices. V2V may be used for information exchange and reminding between vehicles, and most typical application is an anti-collision safety system between the vehicles.

Both participants of V2P are terminal devices. V2P can be used to provide a safety warning to a pedestrian or a non-motor vehicle on a road.

In V2I, one participant is a terminal device, and the other participant is an infrastructure (or a road facility). V2I may be used for communication between a vehicle and an infrastructure. For example, the infrastructure may be a road, a traffic light, a barricade, or the like, and road management information such as a time sequence of a traffic light signal may be obtained.

In device-to-device D2D communication, a sidelink resource is a resource used for communication between terminal devices. The sidelink resource may include a frequency domain sidelink resource and a time domain sidelink resource.

1. DRX Mechanism

In Uu interface communication between a terminal device and a network device, to reduce power consumption of the terminal device, a DRX mechanism is introduced. The DRX mechanism is to configure a DRX cycle for a terminal device in a radio resource control (RRC) connected mode. As shown in FIG. 1a, the DRX cycle includes "On Duration (a wake-up period, a wake-up time, an active time, or duration)" and "Opportunity for DRX (a sleep time or a sleep period)". In the "On Duration" period, the terminal device monitors and receives a physical downlink control channel (PDCCH). In the "Opportunity for DRX" period, the terminal device does not receive PDCCH data to reduce power consumption.

In time domain, a DRX cycle is divided into consecutive DRX cycles. drxStartOffset specifies a start subframe of the DRX cycle, and long DRX cycle specifies a quantity of subframes occupied by a long DRX cycle. The two parameters are specified by a longDRX-CycleStartOffset field. A timer onDurationTimer parameter specifies a quantity of consecutive subframes in which the PDCCH needs to be monitored starting from a start subframe of the DRX cycle, that is, a quantity of subframes in which the active time lasts.

Generally, after the terminal device is scheduled in a subframe and receives or sends data, the terminal device may continue to be scheduled in next several subframes. If the terminal device needs to wait for a next DRX cycle to receive or send the data, an extra delay is caused. Therefore, to reduce such a delay, after being scheduled, the terminal device is continuously in the active time, that is, continuously monitors the PDCCH within the configured active time. An implementation mechanism is as follows: Each time the terminal device is scheduled to initially transmit data, a drx-Inactivity Timer is started (or restarted or enabled), and the terminal device stays in an active state until the timer expires. The drx-Inactivity Timer specifies a quantity of consecutive subframes that remains in the active state after the terminal device successfully decodes a PDCCH of uplink (UL) or downlink (DL) user data that indicates initial transmission. To be specific, each time the terminal device has initially transmitted data to be scheduled, the timer is restarted once. It should be noted that this is initial transmission rather than retransmission. Initial transmission is the first transmission of a transport block (TB). Retransmission is each retransmission of a transport block after the first transmission.

In this application, on duration in the DRX cycle belongs to the active time, and a working period of the timer after the drx-Inactivity Timer is started also belongs to the active time.

Figure 1B:
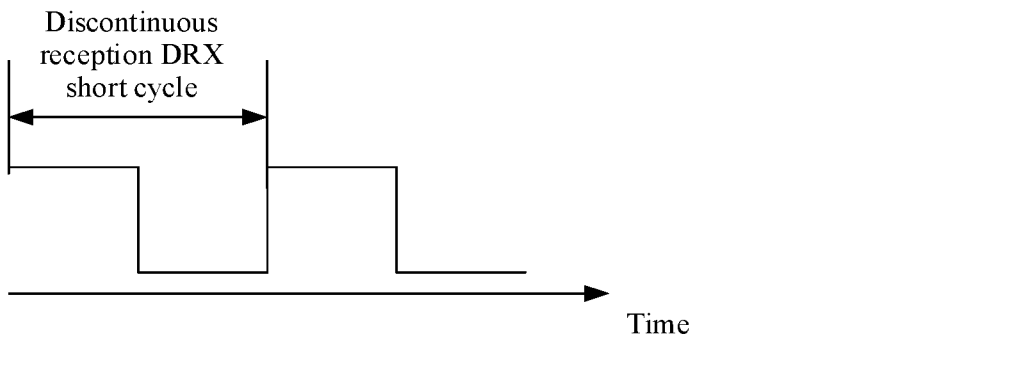
FIG. 1b is a schematic diagram of comparison between a short DRX cycle and a long DRX cycle according to an embodiment of this application.
Figure 1B:
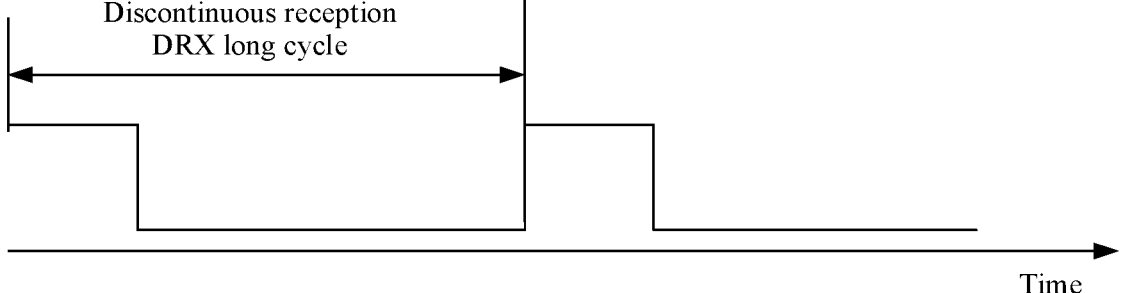

DRX cycle selection includes balance between battery consumption reduction and delay. In one aspect, a long DRX cycle is beneficial to prolong a battery service life of the terminal device. For example, in web browsing, when a user is reading a downloaded web page, if the terminal device continuously receives downlink data during this period, resources are wasted. In another aspect, when new data is transmitted, a shorter DRX cycle facilitates a faster response. For example, the terminal device requests another web page or voice over Internet protocol (VoIP). To meet the foregoing requirement, each terminal device may be configured with two DRX cycles: a short DRX cycle and a long DRX cycle. FIG. 1b is a schematic diagram of comparison between the short DRX cycle and the long DRX cycle.

It should be noted that, in this embodiment of this application, a DRX mode includes an active time and a sleep time. The drxStartOffset may be used to specify a start subframe of the DRX mode, the DRX cycle may be used to specify a quantity of subframes occupied by the DRX mode, and the onDurationTimer may be used to specify that a quantity of consecutive subframes (that is, a quantity of subframes in which the active time lasts) in which a PDCCH needs to be monitored is calculated starting from the start subframe of the DRX mode. The DRX mode in this embodiment of this application may also be referred to as a DRX pattern, a DRX cycle, a DRX cycle set, a DRX index, a DRX identifier, or DRX.

2. Sidelink Resource

In this embodiment of this application, the sidelink resource may also be referred to as a resource for short or a transmission resource. In this application, the sidelink may also be referred to as a sidelink, a sidelink, a PC5 interface link, or a link between terminal devices. In this application, the transport block may also be referred to as a data packet. In this application, "greater than or equal to" may also be referred to as "greater than or equal to", and "less than or equal to" may also be referred to as "less than or equal to".

In D2D communication, a sidelink resource is a resource used for communication between terminal devices. The sidelink resource may include a frequency domain sidelink resource and a time domain sidelink resource. This application mainly discusses the time domain sidelink resource in the sidelink resource. Subsequent sidelink resources may all be time domain sidelink resources. A unified description is provided herein. The time domain sidelink resource may also be referred to as a sidelink time domain resource.

From a perspective of a transmission type, the sidelink resource may include a sidelink sending resource and a sidelink receiving resource. The sidelink sending resource is used to send information, for example, sidelink control information and/or sidelink data information. The sidelink receiving resource is used to receive information, for example, sidelink control information and/or sidelink data information.

Figure 2:
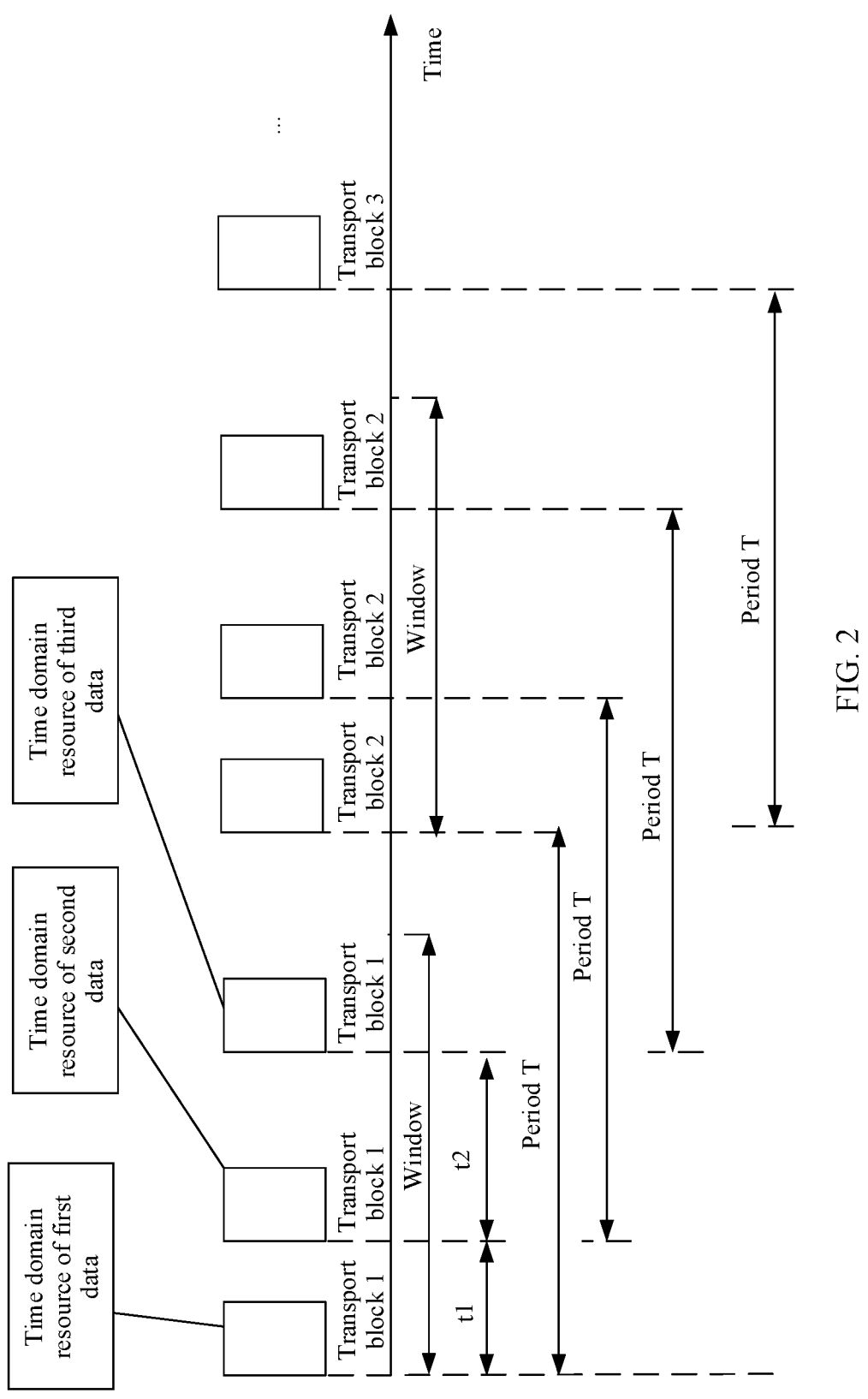
FIG. 2 is a schematic diagram of a time domain resource indicated by an SCI according to an embodiment of this application.

Currently, there are two methods for selecting a sidelink resource. In a first method, a network device allocates a resource to a sidelink. In a second method, a terminal device at a transmit end selects a reserved sidelink resource from an idle resource, and sends sidelink control information (SCI) to a terminal device at a receive end. The SCI carries information that indicates the reserved sidelink resource. Each time SCI is sent, a maximum of N sidelink time domain resources (N is a positive integer) may be reserved, and the sidelink time domain resources reserved in same SCI are used to transmit a same data packet or a same transport block. Alternatively, the sidelink time domain resource reserved in the same SCI may be a first time domain resource to an $X^{th}$ time domain resource used to transmit one data packet or one transport block, and an $(X+1)^{th}$ time domain resource to an $N^{th}$ time domain resource used to transmit another data packet or another transport block, where X is a positive integer greater than or equal to 1 and less than or equal to N, and so on. Optionally, N is 1 or any integer greater than 1. Optionally, the SCI may further carry a period value, and the N time domain resources reserved in one SCI may be repeatedly reserved based on the period value. It should be noted that sidelink time domain resources reserved in different periods are used to transmit different transport blocks. For example, as shown in FIG. 2, N time domain resources in a first period are used to transmit a transport block 1, N time domain resources in a second period are used to transmit a transport block 2, N time domain resources in a third period are used to transmit a transport block 3, and so on.

For reserved sidelink resources, there are three reserved sidelink resources in each period. A sidelink resource reserved in the first period is used to transmit a transport block 1 (TB1), and a sidelink resource reserved in the second period is used to transmit a transport block 2 (TB2). It should be noted that all sidelink resources reserved in each period need to be limited to one window. In other words, the reserved sidelink resources cannot exceed a window, as shown in FIG. 2.

In this application, the subframe may alternatively be replaced with a slot or a mini-slot. This is not limited.

In this application, all "configured" may be configured by a network device for the first terminal by using RRC signaling or media access control (MAC) signaling. The RRC signaling may be broadcast signaling, signaling shared by a group of UEs, dedicated signaling, or the like.

Optionally, in this application, one time domain resource may be one slot or a plurality of slots.

In this application, the sidelink resource may also be referred to as a reserved sidelink resource or an allocated sidelink resource. The resource may be a time domain resource or a frequency domain resource. N time domain resources included in a first resource set are reserved transmission resources used for a same transport block or different transport blocks. A periodic first resource set included in a second resource set includes reserved transmission resources used for different transport blocks.

Figure 1C:
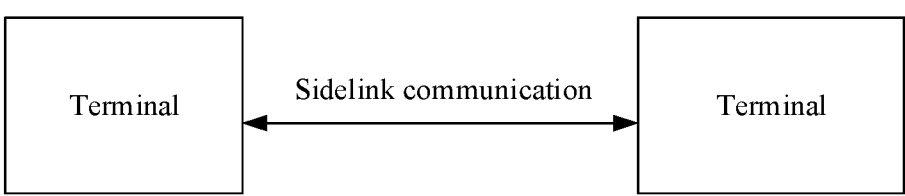
FIG. 1c is a schematic diagram of an architecture of a communication system according to an embodiment of this application.

As shown in FIG. 1*c*, on a sidelink, service data may be sent between terminals in a unicast, multicast, or broadcast manner. A service has a specific feature, for example, may be periodic or non-periodic. In addition, service data has different requirements on resources. For example, for a periodic service, a time domain resource needs to be periodically reserved for data transmission. For a non-periodic service, a time domain resource does not need to be periodically reserved. In this application, the time domain resource may also be referred to as a time domain resource position, or a time domain position, or a time domain resource of a resource block, a time domain position of a resource block, a time domain resource position of a resource block, or the like.

The time domain resource may be a periodic or non-periodic time domain resource. For example, when the time domain resource is a non-periodic time domain resource, the time domain resource may be indicated as a first resource set, and the first resource set includes N time domain resources, where N is an integer greater than or equal to 1. For example, if N=3, the first resource set includes three time domain resources. For another example, when the time domain resource is a periodic time domain resource, the time domain resource may be indicated as a second resource set. The second resource set includes a periodic first resource set, and the first resource set includes N time domain resources, where N is an integer greater than or equal to 1. That the second resource set includes a periodic first resource set may also be referred to as that the second resource set includes at least two first resource sets, and the at least two first resource sets are periodic. For example, N=3. In this case, the second resource set includes time domain resources of a plurality of periods, and each period includes three time domain resources. Alternatively, it is understood that the time domain resources in the second resource set are periodically configured based on every three time domain resources.

In an implementation, a terminal device at a transmit end may send SCI to a terminal device at a receive end, and the SCI includes at least N time domain resources and a resource reservation period value T, where N is a positive integer.

The following describes two examples in which a terminal sends sidelink control information SCI to reserve a time domain resource.

In a first case, a resource reservation period value T=0, indicating that the time domain resource is non-periodic. In other words, only N time domain resources are reserved, and a first resource set may indicate the reserved N time domain resources. The N time domain resources herein may be understood as a maximum quantity of resources (maxNum-Resource). A value of N may be a parameter configured at a higher layer, and the parameter is less than or equal to a maximum value Nmax. When N is greater than or equal to 3, a time interval between any two adjacent time domain resources may be the same or may be different. As shown in FIG. 2, t1 and t2 may be the same, or may be different. Time domain lengths of a plurality of time domain resources may be the same or may be different.

In a second case, a resource reservation period value T is greater than 0, indicating that the time domain resource occurs repeatedly and periodically. In other words, a multiple of N time domain resources are reserved, and a second resource set may indicate the multiple of N reserved time domain resources. It may be understood that the second resource set includes a periodic first resource set, and the first resource set includes N time domain resources, where N is an integer greater than or equal to 1. It may also be understood that the N time domain resources are periodically cyclic based on the resource reservation period T, where N is a positive integer. The periodic cycle may also be referred to as periodic repetition, periodicity, or a periodic occurrence. In this application, "periodicity" and "period" may be interchanged.

In still another description, the SCI indicates a time domain resource set reserved based on the resource reservation period T, and the reserved time domain resource set includes the N time domain resources. In other words, the N time domain resources are periodically cyclic based on the resource reservation period T. The periodic cycle may also be referred to as periodic repetition, periodic reservation, and a sequential periodic occurrence. The period T is a reserved resource period (resource reservation period/periodicity) value indicated in the SC. For example, m time domain resource sets may be reserved based on the resource reservation period T, where m is an integer greater than or equal to 2. In addition, m may also be referred to as a quantity of periods.

A difference between the second case and the first case is as follows: In addition to reserving the N time domain resources, after an interval of T, there is another reserved time domain resource set (a first resource set), including N time domain resources. After an interval of 2 T, there is still another reserved time domain resource set (a first resource set), including N time domain resources, and so on.

In this application, "according to" may also be replaced with "based on". In other words, by the terminal device at the receive end and according to obtained time domain resource may be replaced with by the terminal device at the receive end and based on obtained time domain resource.

As shown in FIG. 2, SCI indicates that the first resource set includes three time domain resources, and the first resource set is periodically reserved for a plurality of times based on a resource reservation period T. A time interval t1 between a first time domain resource and a second time domain resource in the three time domain resources may be the same as or different from a time interval t2 between the second time domain resource and a third time domain resource. The interval may be obtained based on a start point of each time domain resource. To be specific, t1 is obtained by subtracting a start point of the first time domain resource from a start point of the second time domain resource, and t2 is obtained by subtracting the start point of the second time domain resource from a start point of the third time domain resource. The interval may alternatively be obtained based on an end point of each time domain resource. To be specific, t1 is obtained by subtracting an end point of the first time domain resource from an end point of the second time domain resource, and t2 is obtained by subtracting the end point of the second time domain resource from an end point of the third time domain resource.

The following describes a manner of reserving a time domain resource on a sidelink and a manner of setting a duration value of a timer (drx-Inactivity Timer) to match an actual service scheduling requirement.

Figure 3:
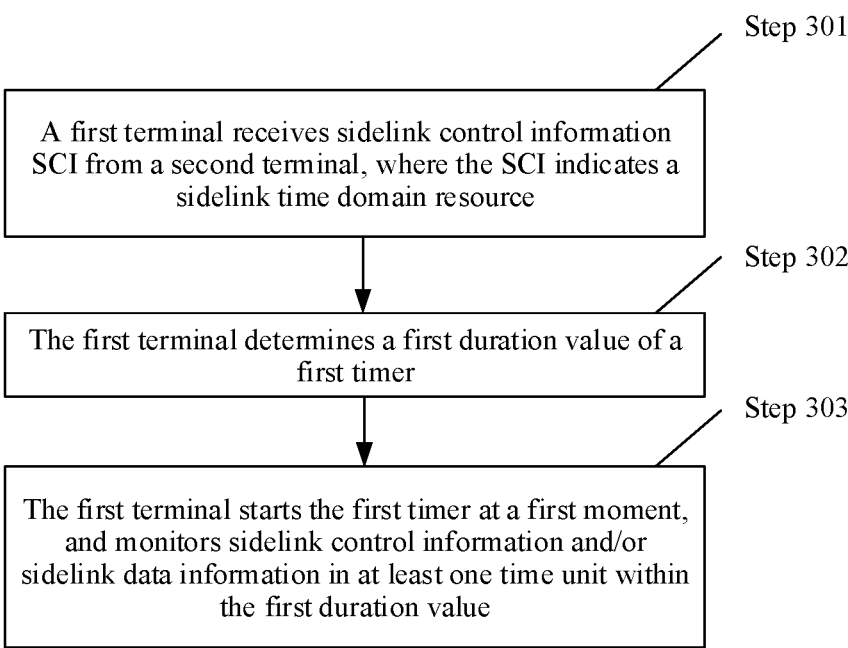
FIG. 3 is a schematic diagram of a communication process according to an embodiment of this application.

As shown in FIG. 3, a schematic diagram of a communication process is provided, which specifically includes the following steps.

Step 301: A second terminal sends SCI to a first terminal, and the first terminal receives the sidelink control information SCI from the second terminal, where the SCI indicates a sidelink time domain resource.

In this application, that the SCI indicates a sidelink time domain resource may also be referred to as that the SCI indicates a reserved sidelink time domain resource, or that the SCI indicates one or more sidelink time domain resources. The sidelink time domain resource indicated by the SCI may be used to transmit sidelink control information and/or sidelink data information. That the SCI indicates a sidelink time domain resource specifically means that a first time domain resource is a time domain resource scheduled by the current SCI, and a time domain resource following the first time domain resource is a reserved time domain resource.

The sidelink time domain resource indicated by the SCI is a time domain resource reserved by the second terminal for the first terminal. For the sidelink time domain resource indicated by the SCI, refer to the manner of reserving a time domain resource described above. Details are not described herein again.

The SCI indicates transmission of data on a new sidelink. In other words, the SCI indicates initial transmission of data instead of retransmission. Alternatively, it is understood that the SCI indicates initially transmitted data or new data transmission. The initially transmitted data herein may be understood as initial transmission of the data.

Step 302: The first terminal determines a first duration value of a first timer.

The first timer may also be referred to as an inactivity timer, a timer configured for a sidelink, an inactivity timer configured for a sidelink, a discontinuous reception DRX timer configured for a sidelink, or a discontinuous reception DRX inactivity timer configured for a sidelink.

In an example, the first duration value belongs to a duration value set configured for a resource pool or a duration value set configured for a sidelink, and the duration value set includes at least one duration value. The duration value set configured for a resource pool may also be referred to as a duration value set corresponding to the resource pool. Optionally, when the first terminal has a plurality of resource pools, each resource pool has a corresponding duration value set. For example, the first terminal has two resource pools, a first resource pool has a corresponding first duration value set, and the second resource pool has a corresponding second duration value set. The duration value set configured for a sidelink may also be referred to as a duration value set corresponding to the sidelink. The duration value set configured for a resource pool or the duration value set configured for a sidelink may be configured by the network device for the first terminal by using RRC signaling or media access control (MAC) signaling. The RRC signaling may be broadcast signaling, signaling shared by a group of UEs, dedicated signaling, or the like.

In another example, the first duration value is determined based on the discontinuous reception DRX configuration information of the first terminal and/or the time domain resource indicated by the SCI.

The following describes a plurality of manners in which the first terminal determines the first duration value of the inactivity timer.

In a possible manner, the first terminal determines ("determining" may also be referred to as selecting) a duration value in the duration value set as the first duration value.

In another possible manner, the first terminal determines the first duration value based on the discontinuous reception configuration information of the first terminal and/or the time domain resource indicated by the SCI.

In still another possible manner, the first terminal receives the first duration value from the second terminal ("receiving from the second terminal" may also be referred to as being configured by the second terminal). It may also be understood that the first duration value is obtained from the second terminal. The first duration value may be carried in the SCI in step 301, or may be sent by the second terminal to the first terminal by using other signaling. The first duration value may be a corresponding duration value index/identifier in the duration value set configured by using RRC signaling. The second terminal may determine ("determining" may also be referred to as selecting) a duration value in the duration value set as the first duration value, and send the first duration value to the first terminal. Alternatively, the second terminal determines the first duration value based on the discontinuous reception configuration information of the first terminal or the second terminal and/or the time domain resource indicated by the SCI, and sends the first duration value to the first terminal.

In yet another possible manner, the first terminal receives the first duration value from the network device. It may also be understood that the first duration value is obtained from the network device. The first duration value is sent through RRC signaling. The network device may determine ("determining" may also be referred to as selecting) a duration value in the duration value set as the first duration value, and send the first duration value to the first terminal.

The discontinuous reception configuration information includes at least one of a discontinuous reception start offset, a discontinuous reception active time (on duration), a discontinuous reception cycle length, a discontinuous reception pattern, and a discontinuous reception pattern index. The active time may also be referred to as active duration, or an active period, or an activation time period, or duration.

The discontinuous reception configuration information of the first terminal may be configured by the second terminal or the network device for the first terminal, or may be determined by the first terminal.

That the first terminal or the second terminal determines the first duration value based on the discontinuous reception configuration information of the first terminal and/or the time domain resource indicated by the SCI includes at least one of the following:

The first terminal determines the first duration value based on the discontinuous reception configuration information of the first terminal and/or a time domain position of the time domain resource indicated by the SCI.

Alternatively, the first terminal determines the first duration value based on whether the discontinuous reception configuration information of the first terminal overlaps with the time domain resource indicated by the SCI.

Alternatively, the first terminal determines the first duration value based on a degree of overlapping between the discontinuous reception configuration information of the first terminal and the time domain resource indicated by the SCI.

Optionally, that the first terminal determines the first duration value based on the discontinuous reception configuration information of the first terminal and/or the sidelink time domain resource indicated by the SCI includes:

The first terminal determines the first duration value based on the discontinuous reception active time (the discontinuous reception duration) of the first terminal and/or the sidelink time domain resource indicated by the SCI.

Optionally, the first terminal determines the first duration value based on the discontinuous reception duration of the first terminal and/or the time domain position of the time domain resource indicated by the SCI.

Alternatively, the first terminal determines the first duration value based on whether the discontinuous reception duration of the first terminal overlaps with the time domain resource indicated by the SCI.

Alternatively, the first terminal determines the first duration value based on a degree of overlapping between the discontinuous reception duration of the first terminal and the time domain resource indicated by the SCI.

A specific process is subsequently described with reference to FIG. 6a to FIG. 7d.

When the first duration value of the first timer belongs to the duration value set configured for a resource pool or the duration value set configured for a sidelink, an order of step 302 and step 301 is not limited.

Step 303: The first terminal starts the first timer at a first moment, and monitors (detects or receives) sidelink control information and/or sidelink data information in at least one time unit within the first duration value.

An order of step 303 and step 302 is not limited.

Monitoring (detecting or receiving) the sidelink control information and/or the sidelink data information in at least one time unit within a first duration value of the first timer may be understood as that the first terminal is in the active time within the first duration value.

In other words, the first terminal monitors the sidelink control information and/or the sidelink data information in at least one time unit within the first duration value of the first timer, so that the first terminal is in the active time in the sidelink time domain resource indicated by the SCI.

The time unit is at least one of a slot, a symbol, a mini-slot, or a mini-symbol. The at least one time unit may be one or more symbols, one or more slots, or a combination of one or more slots and one or more symbols.

The first time domain resource in this application is the first one of time domain resources indicated by currently detected SCI. The currently detected SCI is also located in the first time domain resource.

The first terminal stops the first timer when determining that the first timer exceeds the first duration value. It should be noted that "monitoring" and "receiving" in this application are different. "Monitoring" is a state, and receiving may not be performed. After detecting a piece of SCI by monitoring, the first terminal restarts or starts the timer. The SCI indicates that the first terminal needs to receive data. The time unit includes but is not limited to at least one of a subframe, a slot, a mini-slot, or a symbol. In this application, a moment (timing/moment/occasion) may also be referred to as a time position or a time domain position.

It should be noted that a time domain resource occupied in the active time is far greater than a time domain resource occupied by the SCI. If the first terminal detects a piece of SCI by monitoring in the active time, the active time includes at least a time domain resource (a symbol position) occupied by the SCI detected by monitoring, so that the first terminal will not be in a sleep time immediately after a next symbol following a start symbol of the SCI is detected by monitoring, avoiding that the first terminal cannot completely receive the SCI. It may also be understood that if the SCI is located in first m symbols in one slot, at least m symbols in one reserved resource are located in DRX on duration, to ensure that the SCI can be correctly detected.

Figure 4A:
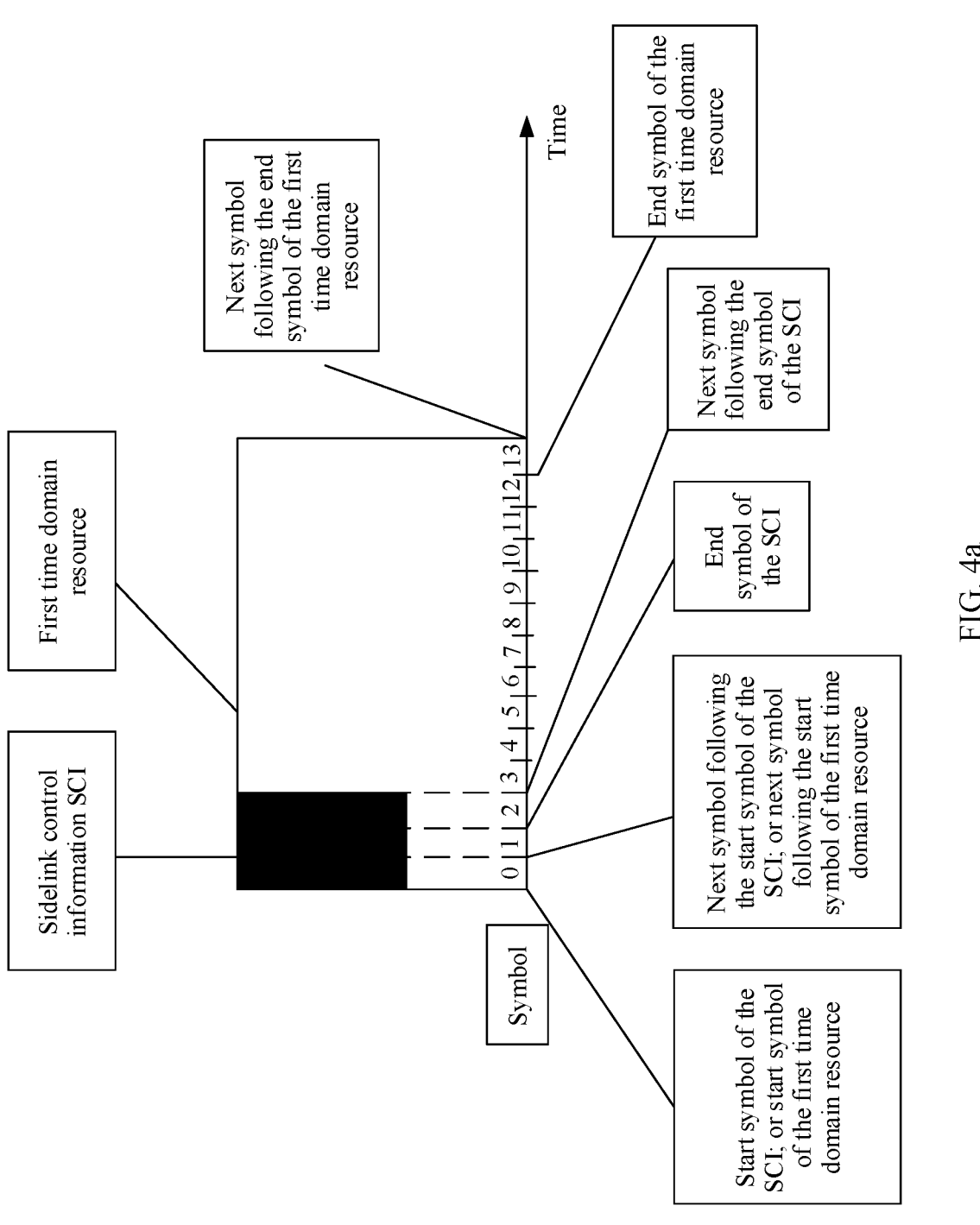
FIG. 4a is a schematic diagram of comparison between a time domain resource indicated by an SCI and a first time domain resource according to an embodiment of this application.
Figure 4B:
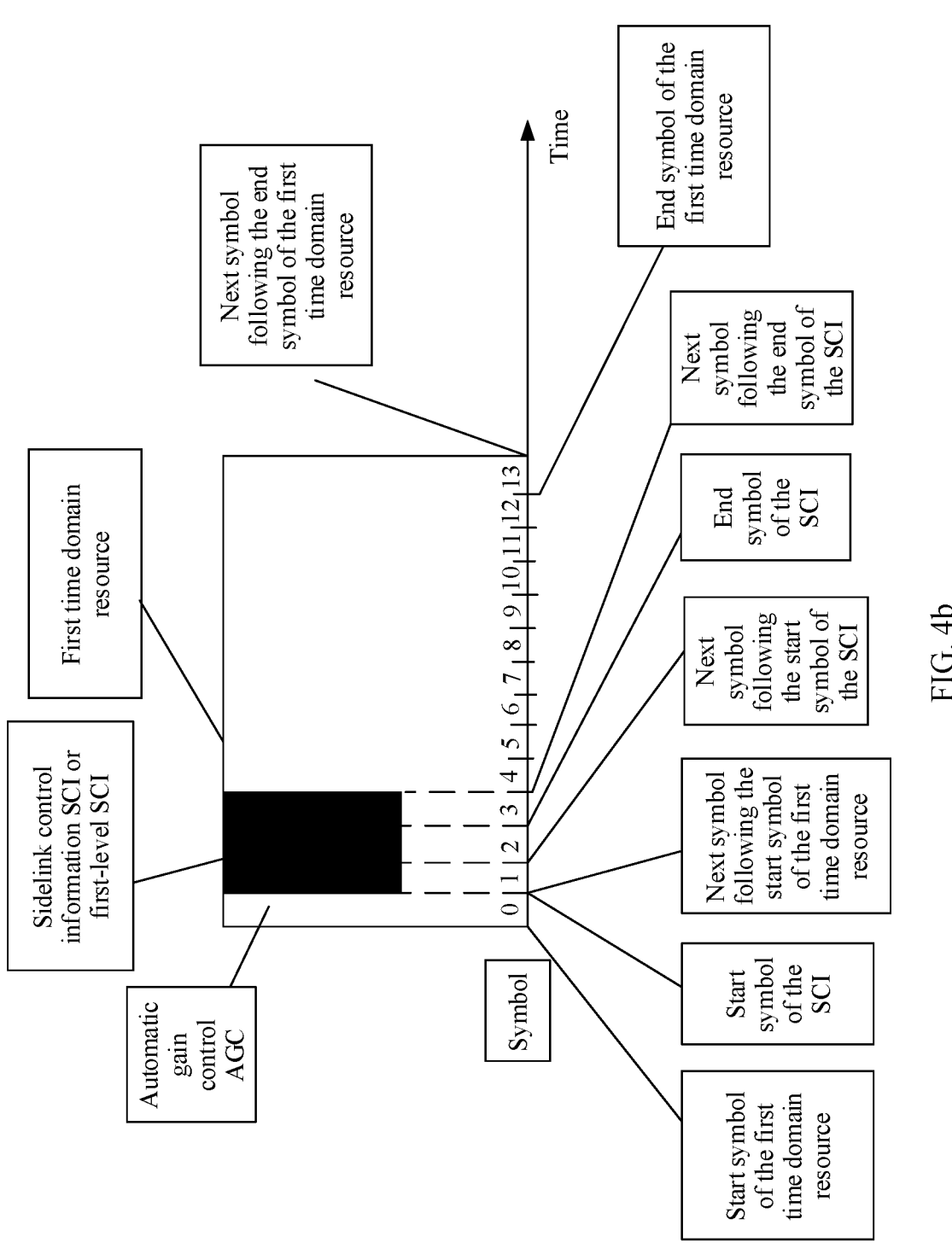
FIG. 4b is a schematic diagram of comparison between another time domain resource indicated by an SCI and a first time domain resource according to an embodiment of this application.

The following describes an example of the first moment by using FIG. 4a and FIG. 4b as examples. The first moment includes but is not limited to any one of the following:

A start symbol of the SCI. In this application, the start symbol of the SCI may be a start point of the start symbol of the SCI or an end point of the start symbol of the SCI. The start symbol of the SCI may also be referred to as a start of the SCI, or a start of the SCI received by the first terminal, or a start moment at which the first terminal receives the SCI.

A next symbol following the start symbol of the SC. In this application, the next symbol following the start symbol of the SCI may be a start point of the next symbol following the start symbol of the SCI or an end point of the next symbol following the start symbol of the SC. The end point of the start symbol of the SCI and the start point of the next symbol following the start symbol of the SCI may be a same moment. The next symbol following the start symbol of the SCI may also be referred to as a moment after the first terminal receives the start symbol of the SCI, or referred to as an end moment at which the first terminal receives the start symbol of the SCI.

An end symbol of the SCI. In this application, the end symbol of the SCI may be a start point of the end symbol of the SCI or an end point of the end symbol of the SCI. The end symbol of the SCI may also be referred to as an end of the SCI, an end of the SCI received by the first terminal, or an end moment or an end moment at which the first terminal receives the SCI.

A next symbol following the end symbol of the SCI. In this application, the next symbol following the end symbol of the SCI may be a start point of the next symbol following the end symbol of the SCI or an end point of the next symbol following the end symbol of the SCI. The end point of the end symbol of the SCI and the start point of the next symbol following the end symbol of the SCI may be a same moment. The next symbol following the end symbol of the SCI may also be referred to as a moment after the first terminal receives the end symbol of the SCI, or referred to as an end moment at which the first terminal receives the end symbol of the SCI.

A start symbol of a first time domain resource indicated by the SCI. In this application, the start symbol of the first time domain resource indicated by the SCI may be a start point of the start symbol of the first time domain resource indicated by the SCI or an end point of the start symbol of the first time domain resource indicated by the SCI.

The start symbol of the first time domain resource indicated by the SCI may be the same as the start symbol of the SCI. Alternatively, in view of a quantity of symbols required by automatic gain control (AGC), the start symbol of the first time domain resource indicated by the SCI may be earlier than the start symbol of the SCI. Optionally, the start symbol of the SCI may be the start symbol of the first time domain resource indicated by the SCI plus a quantity of AGC symbols.

A next symbol following the start symbol of the first time domain resource indicated by the SCI. In this application, the next symbol following the start symbol of the first time domain resource indicated by the SCI may be a start point of the next symbol following the start symbol of the first time domain resource indicated by the SCI or an end point of the next symbol following the start symbol of the first time domain resource indicated by the SCI. The end point of the start symbol of the first time domain resource and the start point of the next symbol following the start symbol of the first time domain resource may be a same moment.

An end symbol of the first time domain resource indicated by the SCI. In this application, the end symbol of the first time domain resource indicated by the SCI may be a start point of the end symbol of the first time domain resource indicated by the SCI or an end point of the end symbol of the first time domain resource indicated by the SCI.

A next symbol following the end symbol of the first time domain resource indicated by the SCI. In this application, the next symbol following the end symbol of the first time domain resource indicated by the SCI may be a start point of the next symbol following the end symbol of the first time domain resource indicated by the SCI or an end point of the next symbol following the end symbol of the first time domain resource indicated by the SCI. The end point of the end symbol of the first time domain resource and the start point of the next symbol following the end symbol of the first time domain resource may be a same moment.

An end symbol of a slot in which the SCI is located.

A next symbol following the end symbol of the slot in which the SCI is located.

An end point of the end symbol of the slot in which the SCI is located.

A start point of the next symbol following the end symbol of the slot in which the SCI is located.

A next slot after a slot in which the SCI is located. It may be understood that the next symbol following the end symbol of the slot in which the SCI is located belongs to the next slot. With reference to FIG. 4a, the first time domain resource includes 14 symbols: a symbol 0 to a symbol 13. The first time domain resource is a time domain resource in which the SCI is located, namely a slot in which the SCI is located. The next symbol following the end symbol of the first time domain resource is located in a next slot.

Following the end symbol of the slot in which the SCI is located.

It may be understood that the first time domain resource indicated by the SCI may be, for example, a time domain resource in which the SCI is located. In this application, one time domain resource may be one slot or a plurality of slots. For example, the first time domain resource indicated by the SCI may be understood as a slot in which the SCI is located.

The foregoing SCI is the SCI in step 301.

In this application, a "start symbol of a time domain resource" may also be referred to as a "start of a time domain resource" or a "start moment of a time domain resource". An "end symbol of a time domain resource" may also be referred to as an "end of a time domain resource" or an "end moment of a time domain resource". "A start point of a symbol" may also be referred to as a "start moment of a symbol" or a "start of a symbol". An "end point of a symbol" may also be referred to as an "end moment of a symbol" or an "end of a symbol". A "next symbol following a symbol" may also be referred to as a "next symbol after a symbol", "following a symbol", or a "first symbol following a symbol". For example, a next symbol following an end symbol may also be referred to as a next symbol after an end symbol, following an end symbol, or a first symbol following an end symbol.

It should be noted that, in the example in FIG. 4a, the start symbol of the SCI and the start symbol of the first time domain resource indicated by the SCI are a same moment. In the example in FIG. 4b, a start symbol of SCI and a start symbol of a first time domain resource indicated by the SCI are not a same moment, and automatic gain control (AGC) needs one symbol. Both FIG. 4a and FIG. 4b are described by using an example in which the SCI occupies three symbols and the first time domain resource occupies 14 symbols. In actual application, a quantity of symbols occupied by the SCI and a quantity of symbols occupied by the first time domain resource are not limited. Actually, the first time domain resource may occupy 14 or 12 symbols. In FIG. 4a and FIG. 4b, a start point of a symbol is used as an example for description.

In this application, the terminal device starts or restarts the first timer with reference to currently detected SC. In other words, each time SCI is detected, whether to start or restart the first timer is determined. Therefore, the first time domain resource is a first one in time domain resources indicated by the currently detected SC. The SCI is located in the first time domain resource. The first time domain resource may also be referred to as a time domain resource scheduled by the currently detected SCI.

If the first moment is before the end point of the end symbol of the SCI in step 301, the first terminal may monitor information in the SCI in step 301 within the first duration value, or may detect, by monitoring, other SCI different from the SCI in step 301. If the first moment is located at or after the end point of the end symbol of the SCI in step 301, the first terminal may detect, by monitoring within the first duration value, other SCI different from the SCI in step 301. The SCI received by the first terminal in step 301 may be referred to as first SCI, and other SCI different from the SCI in step 301 may be referred to as second SCI. "The SCI" described in the following embodiments may be considered as the first SCI.

The following specifically describes a process of determining the first duration value based on the time domain resource of the discontinuous reception DRX active time of the first terminal and/or the time domain resource indicated by the SCI described in step 302. Both the first terminal and the second terminal may determine the first duration value in the following manner.

In an example, the first duration value may be determined based on a second moment and a third moment. Specifically, a difference between the third moment and the second moment may be determined as the first duration value, or a sum of the difference and a first parameter may be determined as the first duration value. The first parameter is a length of a time domain resource or an offset. The second moment and the first moment may be the same or different. Alternatively, a minimum quantity of slots greater than or equal to the difference between the third moment and the second moment may be determined as the first duration value. In other words, the difference between the third moment and the second moment is rounded up to obtain the first duration value. In other words, the first duration value includes an integer quantity of slots, and the difference is rounded up to obtain the first duration value indicated based on the quantity of slots. For example, when the difference between the third moment and the second moment is 2.5 slots, the first duration value is determined as three slots.

The following describes examples of the second moment and the third moment. It should be noted that in the following examples of the second moment and the third moment, a "start symbol" may be a start point or an end point of a start symbol, an "end symbol" may be a start point or an end point of an end symbol, and a "next symbol" may be a start point or an end point of a next symbol. A start symbol of the SCI may also be referred to as a start of the SCI, or a start of receiving the SCI by the first terminal. An end symbol of the SCI may also be referred to as an end of the SCI, an end of receiving the SCI by the first terminal, or the like, which is similar to the foregoing examples in which the first moment is described.

For example, the second moment includes but is not limited to any one of the following:

a start symbol of the SCI, for example, a start point of the start symbol of the SCI or an end point of the start symbol of the SCI;

a next symbol following the start symbol of the SCI, for example, a start point of the next symbol following the start symbol of the SCI or an end point of the next symbol following the start symbol of the SCI;

an end symbol of the SCI, for example, a start point of the end symbol of the SCI or an end point of the end symbol of the SCI;

a next symbol following the end symbol of the SCI, for example, a start point of the next symbol following the end symbol of the SCI or an end point of the next symbol following the end symbol of the SCI;

a start symbol of the first time domain resource indicated by the SCI, for example, a start point of the start symbol of the first time domain resource indicated by the SCI or an end point of the start symbol of the first time domain resource indicated by the SCI;

a next symbol following the start symbol of the first time domain resource indicated by the SCI, for example, a start point of the next symbol following the start symbol of the first time domain resource indicated by the SCI or an end point of the next symbol following the start symbol of the first time domain resource indicated by the SCI;

an end symbol of the first time domain resource indicated by the SCI, for example, a start point of the end symbol of the first time domain resource indicated by the SCI or an end point of the end symbol of the first time domain resource indicated by the SCI; or a next symbol following the end symbol of the first time domain resource indicated by the SCI, for example, a start point of the next symbol following the end symbol of the first time domain resource indicated by the SCI or an end point of the next symbol following the end symbol of the first time domain resource indicated by the SCI.

For example, the third moment includes but is not limited to any one of the following:

a start symbol of an $x^{th}$ time domain resource in the first resource set indicated by the SCI, for example, a start point of the start symbol of the $x^{th}$ time domain resource in the first resource set indicated by the SCI or an end point of the start symbol of the $x^{th}$ time domain resource in the first resource set indicated by the SCI;

a next symbol following the start symbol of the $x^{th}$ time domain resource in the first resource set indicated by the SCI, for example, a start point of the next symbol following the start symbol of the $x^{th}$ time domain resource in the first resource set indicated by the SCI or an end point of the next symbol following the start symbol of the $x^{th}$ time domain resource in the first resource set indicated by the SCI;

an end symbol of the $x^{th}$ time domain resource in the first resource set indicated by the SCI, for example, a start point of the end symbol of the $x^{th}$ time domain resource in the first resource set indicated by the SCI or an end point of the end symbol of the $x^{th}$ time domain resource in the first resource set indicated by the SCI;

a next symbol following the end symbol of the $x^{th}$ time domain resource in the first resource set indicated by the SCI, for example, a start point of the next symbol following the end symbol of the $x^{th}$ time domain resource in the first resource set indicated by the SCI or an end point of the next symbol following the end symbol of the $x^{th}$ time domain resource in the first resource set indicated by the SCI;

a start symbol of an $x^{th}$ time domain resource in a $y^{th}$ first resource set in the second resource set indicated by the SCI, for example, a start point of the start symbol of an $x^{th}$ time domain resource in a $y^{th}$ first resource set in the second resource set indicated by the SCI or an end point of the start symbol of an $x^{th}$ time domain resource in a $y^{th}$ first resource set in the second resource set indicated by the SCI;

a next symbol following the start symbol of the $x^{th}$ time domain resource in the $y^{th}$ first resource set in the second resource set indicated by the SCI, for example, a start point of the next symbol following the start symbol of the $x^{th}$ time domain resource in the $y^{th}$ first resource set in the second resource set indicated by the SCI or an end point of the next symbol following the start symbol of the $x^{th}$ time domain resource in the $y^{th}$ first resource set in the second resource set indicated by the SCI;

an end symbol of the $x^{th}$ time domain resource in the $y^{th}$ first resource set in the second resource set indicated by the SCI, for example, a start point of the end symbol of the $x^{th}$ time domain resource in the $y^{th}$ first resource set in the second resource set indicated by the SCI or an end point of the end symbol of the $x^{th}$ time domain resource in the $y^{th}$ first resource set in the second resource set indicated by the SCI; or a next symbol following the end symbol of the $x^{th}$ time domain resource in the $y^{th}$ first resource set in the second resource set indicated by the SCI, for example, a start point of the next symbol following the end symbol of the $x^{th}$ time domain resource in the $y^{th}$ first resource set in the second resource set indicated by the SCI or an end point of the next symbol following the end symbol of the $x^{th}$ time domain resource in the $y^{th}$ first resource set in the second resource set indicated by the SCI.

The foregoing SCI is the SCI in step 301. In the foregoing descriptions, y is an integer greater than or equal to 1, x is an integer greater than or equal to 1, x is an integer less than or equal to N, and N is a quantity of time domain resources included in the first resource set. In other words, the first resource set includes N time domain resources, and N is an integer greater than or equal to 1.

For example, when the second moment is the start point of the start symbol of the first time domain resource, and the third moment is the end point of the end symbol of the first time domain resource, the first duration value may be a duration value of the first time domain resource (namely, a duration value from the start point of the start symbol of the first time domain resource to the end point of the end symbol of the first time domain resource).

For another example, the second moment is the end point of the start symbol of the first time domain resource, and the third moment is the end point of the end symbol of the first time domain resource. In this case, the first duration value may be a duration value from the end point of the start symbol of the first time domain resource to the end point of the end symbol of the first time domain resource. Alternatively, the first duration value may be determined in a rounding manner. For example, the first time domain resource is one slot, and a duration value from the end point of the start symbol of the first time domain resource to the end point of the end symbol of the first time domain resource is less than one slot. The duration value from an end point of a start symbol of one time domain resource to the end point of the end symbol of the first time domain resource may be rounded up based on a quantity of slots, and the first duration value is one slot, namely a duration value of the first time domain resource.

The following describes in which cases the difference between the third moment and the second moment is determined as the first duration value, and in which cases the sum of the difference and the first parameter is determined as the first duration value.

In an example, when the third moment is an end point of the symbol described above, and the second moment is a start point of the symbol described above, the difference between the third moment and the second moment may be determined as the first duration value.

In an example, when the third moment is an end point of the symbol described above, and the second moment is an end point of the symbol described above, the difference between the third moment and the second moment may be determined as the first duration value.

In an example, when the third moment is a start point of the symbol described above, and the second moment is a start point of the symbol described above, the difference between the third moment and the second moment may be determined as the first duration value, or the sum of the difference and duration of a time domain resource may be determined as the first duration value. When a time point at which the first timer drxinactivityTimer is started is a start point of a symbol, the first duration value is used, to ensure that data in the time domain resource indicated by the SCI is correctly received.

In an example, when the third moment is a start point of the symbol described above, and the second moment is an end point of the symbol described above, the difference between the third moment and the second moment may be first determined, and the sum of the difference and duration of a time domain resource is determined as the first duration value.

Because there is a delay between a receiving time of the first terminal and a sending time of the second terminal when the second terminal sends data information or control information to the first terminal, a delay value may also be considered when the first duration value is determined.

In an example, when the difference between the third moment and the second moment is determined as the first duration value, the sum of the difference and an offset may be determined as the first duration value.

In another example, when the sum of the difference between the third moment and the second moment and the duration of one time domain resource is determined as the first duration value, the sum of the difference, the duration of one time domain resource, and the offset may be determined as the first duration value.

The offset may be a delay value of transmitting information by the second terminal to the first terminal. The offset may be configured in the first terminal, may be sent by the second terminal to the first terminal, or may be sent by the network device to the first terminal.

In an example, one piece of SCI includes two levels of SCI: first-level SCI and second-level SCI.

Optionally, there may be the following examples, but a structure of the two-level SCI is not limited thereto.

Figure 5A:
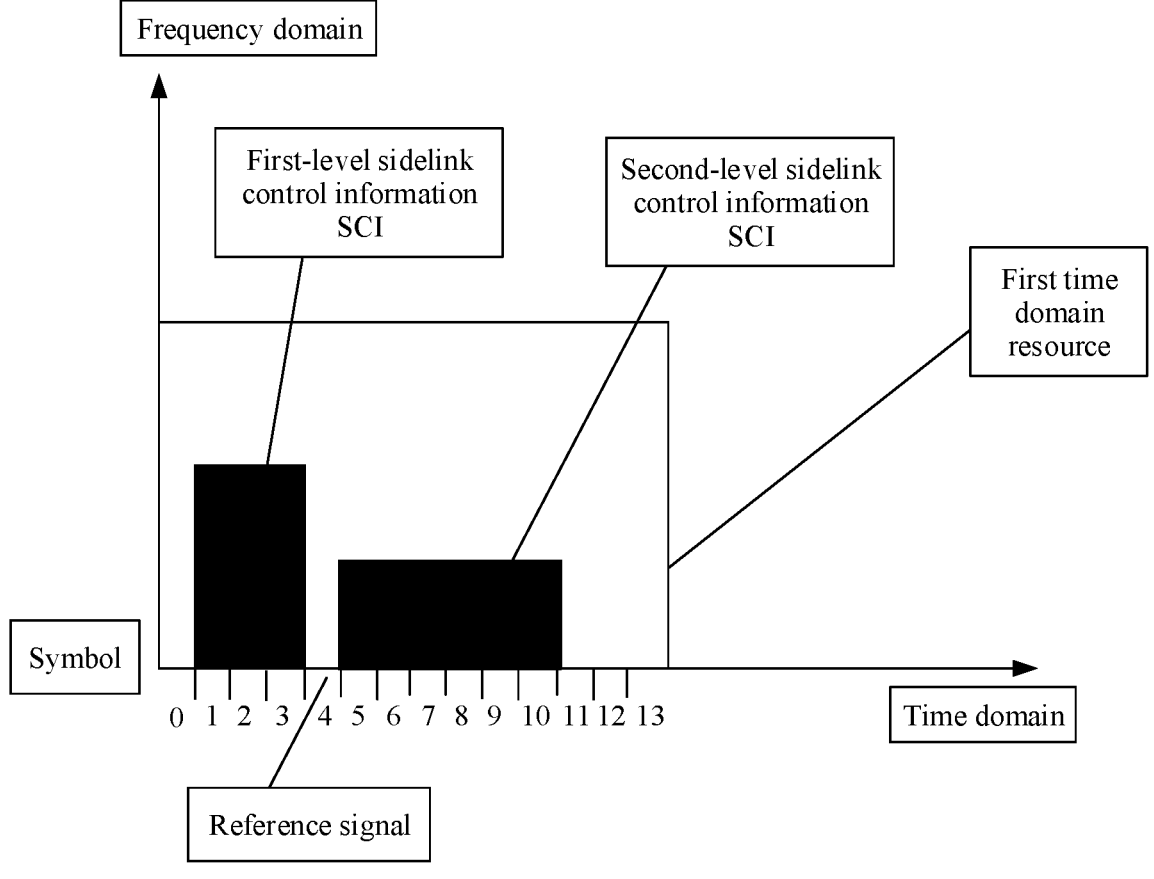
FIG. 5a is a schematic diagram of a time domain resource indicated by a second-level SCI according to an embodiment of this application.

In an example shown in FIG. 5a, the first time domain resource occupies 14 symbols: a symbol 0 to a symbol 13. The first-level SCI occupies a symbol 1, a symbol 2, and a symbol 3. The second-level SCI occupies five symbols: a symbol 5 to a symbol 9. A frequency domain resource occupied by the first-level SCI is a part of a frequency domain resource occupied by the first data resource, and a frequency domain resource occupied by the second-level SCI is a part of the frequency domain resource occupied by the first data resource. The symbol 4 may be a symbol occupied by a reference signal.

Figure 5B:
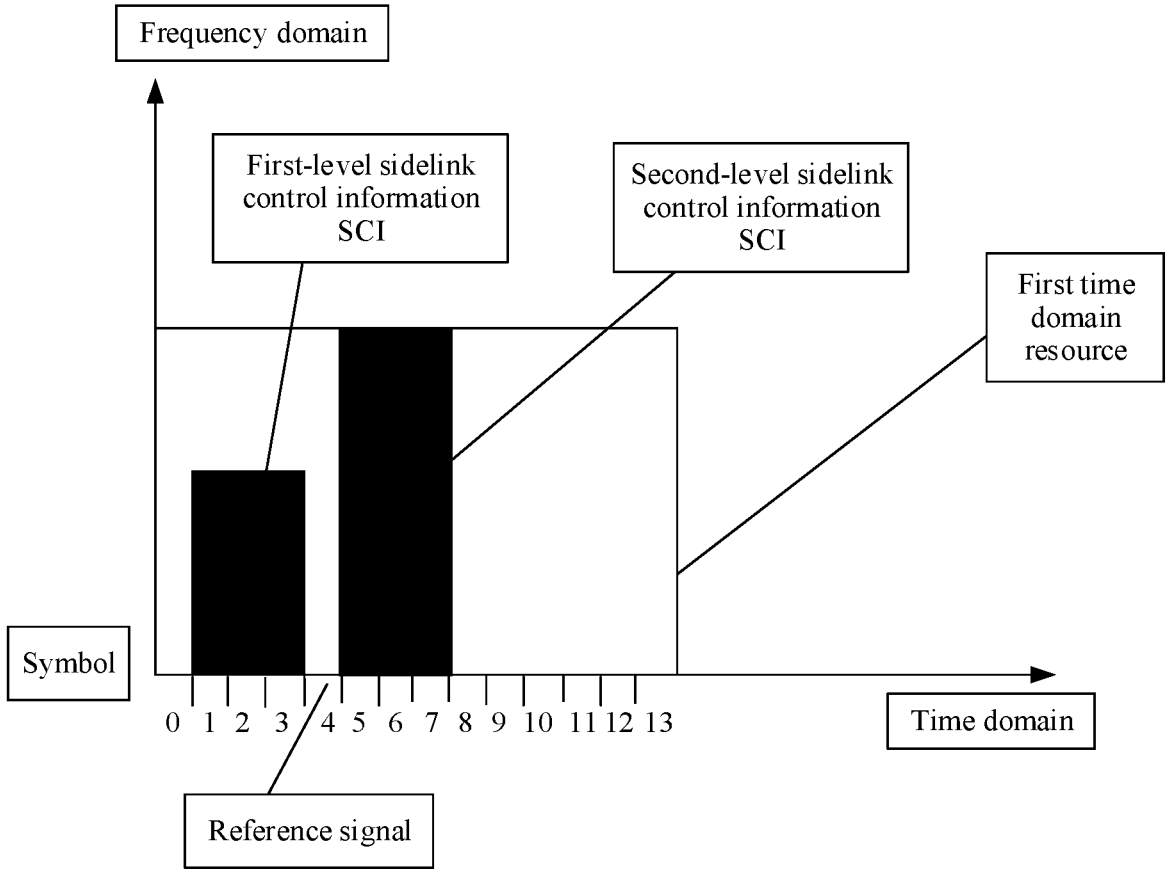
FIG. 5b is a schematic diagram of another time domain resource indicated by a second-level SCI according to an embodiment of this application.

In an example shown in FIG. 5b, the first time domain resource occupies 14 symbols: a symbol 0 to a symbol 13. The first-level SCI occupies a symbol 1, a symbol 2, and a symbol 3. The second-level SCI occupies three symbols: a symbol 5, a symbol 6, and a symbol 7. A frequency domain resource occupied by the first-level SCI is a part of a frequency domain resource occupied by the first data resource, and a frequency domain resource occupied by the second-level SCI is the entire frequency domain resource occupied by the first data resource. The symbol 4 may be a symbol occupied by a reference signal.

Figure 5C:
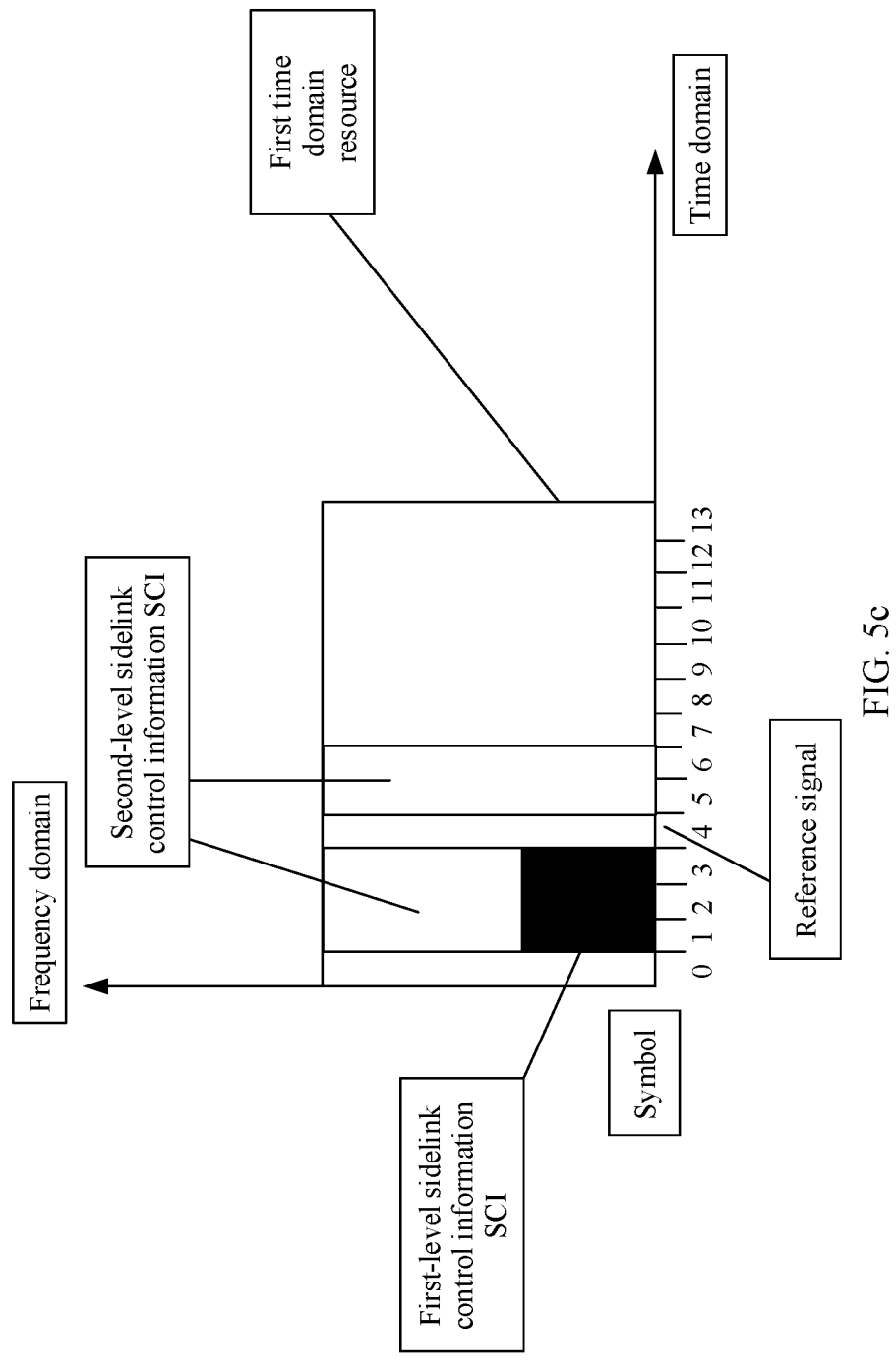
FIG. 5c is a schematic diagram of still another time domain resource indicated by a second-level SCI according to an embodiment of this application.

In an example shown in FIG. 5c, the first time domain resource occupies 14 symbols: a symbol 0 to a symbol 13. The first-level SCI occupies a symbol 1, a symbol 2, and a symbol 3. The second-level SCI occupies five symbols: a symbol 1, a symbol 2, a symbol 3, a symbol 5, and a symbol 6. A frequency domain resource occupied by the first-level SCI is a part of a frequency domain resource occupied by the first data resource, frequency domain resources occupied by the second-level SCI on the symbol 5 and the symbol 6 are the entire frequency domain resource occupied by the first data resource, and frequency domain resources occupied by the second-level SCI on the symbol 1, the symbol 2, and the symbol 3 are a part of the frequency domain resource occupied by the first data resource. The symbol 4 may be a symbol occupied by a reference signal.

The SCI received in step 301 may be first-level SCI, or include first-level SCI and second-level SCI.

When the SCI in step 301 is first-level SCI, the SCI described in the foregoing embodiment may be replaced with first-level SCI.

For example, when the SCI in the first moment and the second moment described above is replaced with first-level SCI, the first moment or the second moment includes but is not limited to any one of the following: In the following examples for the first moment, the second moment, and the third moment, a "start symbol" may be a start point or an end point of a start symbol, an "end symbol" may be a start point or an end point of an end symbol, and a "next symbol" may be a start point or an end point of a next symbol.

A start symbol of the first-level SCI, for example, may be a start point of the start symbol of the first-level SCI or an end point of the start symbol of the first-level SCI.

A next symbol following the start symbol of the first-level SCI, for example, may be a start point of the next symbol following the start symbol of the first-level SCI or an end point of the next symbol following the start symbol of the first-level SCI. The following examples are similar, and details are not described again.

An end symbol of the first-level SCI;

a next symbol following the end symbol of the first-level SCI;

a start symbol of the first time domain resource indicated by the first-level SCI;

a next symbol following the start symbol of the first time domain resource indicated by the first-level SCI;

an end symbol of the first time domain resource indicated by the first-level SCI; or a next symbol following the end symbol of the first time domain resource indicated by the first-level SCI.

For example, when the SCI in the foregoing described third moment is replaced with first-level SCI, the third moment includes but is not limited to any one of the following:

a start symbol of an $x^{th}$ time domain resource in the first resource set indicated by the first-level SCI;

a next symbol following the start symbol of the $x^{th}$ time domain resource in the first resource set indicated by the first-level SCI;

an end symbol of the $x^{th}$ time domain resource in the first resource set indicated by the first-level SCI;

a next symbol following the end symbol of the $x^{th}$ time domain resource in the first resource set indicated by the first-level SCI;

a start symbol of an $x^{th}$ time domain resource in a $y^{th}$ first resource set in the second resource set indicated by the first-level SCI;

a next symbol following the start symbol of the $x^{th}$ time domain resource in the $y^{th}$ first resource set in the second resource set indicated by the first-level SCI;

an end symbol of the $x^{th}$ time domain resource in the $y^{th}$ first resource set in the second resource set indicated by the first-level SCI; or a next symbol following the end symbol of the $x^{th}$ time domain resource in the $y^{th}$ first resource set in the second resource set indicated by the first-level SCI, where y is an integer greater than or equal to 1, x is an integer greater than or equal to 1, and x is an integer less than or equal to n.

When the SCI in step 301 includes the first-level SCI and the second-level SCI, examples of the first moment, the second moment, and the third moment may be adjusted.

In addition, the following example may still be based on the foregoing description: a "start symbol" may be a start point or an end point of a start symbol, an "end symbol" may be a start point or an end point of an end symbol, and a "next symbol" may be a start point or an end point of a next symbol. A start symbol of the SCI may also be referred to as a start of the SCI, or a start of receiving the SCI by the first terminal. An end symbol of the SCI may also be referred to as an end of the SCI, an end of receiving the SCI by the first terminal, or the like, to perform adaptive adjustment. The following uses only the start symbol of the SCI as an example for description. Other examples are applicable, and details are not described again.

In this application, a "start symbol of the SCI" may be a start symbol of the first-level SCI included in the SCI, or may be a start symbol of the second-level SCI included in the SCI. For example, a "start symbol of the SCI" may be an end point or a start point of the start symbol of the first-level SCI. For another example, a "start symbol of the SCI" may be an end point or a start point of the start symbol of the second-level SCI.

In this application, a "next symbol following the start symbol of the SCI" may be a next symbol following the start symbol of the first-level SCI included in the SCI, or may a next symbol following the start symbol of the second-level SCI included in the SCI.

In this application, an "end symbol of the SCI" may be an end symbol of the first-level SCI included in the SCI, or may be an end symbol of the second-level SCI included in the SCI.

In this application, a "next symbol following the end symbol of the SCI" may be a next symbol following the end symbol of the first-level SCI included in the SCI, or may be a next symbol following the end symbol of the second-level SCI included in the SCI.

In this application, a "start symbol, a next symbol following the start symbol, an end symbol, or a next symbol following the end symbol of the first time domain resource indicated by the SCI" may be a start symbol, a next symbol following the start symbol, an end symbol, or a next symbol following the end symbol of the first time domain resource indicated by the first-level SCI included in the SCI.

In this application, a "start symbol, a next symbol following the start symbol, an end symbol, or a next symbol following the end symbol of the $x^{th}$ time domain resource in the first resource set indicated by the SCI" may be a start symbol, a next symbol following the start symbol, an end symbol, or a next symbol following the end symbol of the $x^{th}$ time domain resource indicated by the first-level SCI included in the SCI.

In this application, a "start symbol, a next symbol following the start symbol, an end symbol, or a next symbol following the end symbol of the $x^{th}$ time domain resource in the $y^{th}$ first resource set in the second resource set indicated by the SCI" may be a start symbol, a next symbol following the start symbol, an end symbol, or a next symbol following the end symbol of the $x^{th}$ time domain resource in the $y^{th}$ first resource set in the second resource set indicated by the first-level SCI included in the SCI.

In the following examples for the first moment, the second moment, and the third moment, a "start symbol" may be a start point or an end point of a start symbol, an "end symbol" may be a start point or an end point of an end symbol, and a "next symbol" may be a start point or an end point of a next symbol.

For example, the SCI includes first-level SCI and second-level SCI, and the first moment includes but is not limited to any one of the following:

a start symbol of the first-level SCI or a start symbol of the second-level SCI, for example, a start point of the start symbol of the first-level SCI, an end point of the start symbol of the first-level SCI, a start point of the start symbol of the second-level SCI, or an end point of the start symbol of the second-level SCI;

a next symbol following the start symbol of the first-level SCI or a next symbol following the start symbol of the second-level SCI, for example, a start point of the next symbol following the start symbol of the first-level SCI, an end point of the next symbol following the start symbol of the first-level SCI, a start point of the next symbol following the start symbol of the second-level SCI, or an end point of the next symbol following the start symbol of the second-level SCI, and the following examples are similar, and details are not described again;

an end symbol of the first-level SCI or an end symbol of the second-level SCI;

a next symbol following the end symbol of the first-level SCI or a next symbol following the end symbol of the second-level SCI;

a start symbol of the first time domain resource indicated by the first-level SCI;

a next symbol following the start symbol of the first time domain resource indicated by the first-level SCI;

an end symbol of the first time domain resource indicated by the first-level SCI; or a next symbol following the end symbol of the first time domain resource indicated by the first-level SCI.

For example, when the SCI includes first-level SCI and second-level SCI, the second moment includes but is not limited to any one of the following:

a start symbol of the first-level SCI or a start symbol of the second-level SCI;

a next symbol following the start symbol of the first-level SCI or a next symbol following the start symbol of the second-level SCI;

an end symbol of the first-level SCI or an end symbol of the second-level SCI;

a next symbol following the end symbol of the first-level SCI or a next symbol following the end symbol of the second-level SCI;

a start symbol of the first time domain resource indicated by the first-level SCI;

a next symbol following the start symbol of the first time domain resource indicated by the first-level SCI;

an end symbol of the first time domain resource indicated by the first-level SCI; or a next symbol following the end symbol of the first time domain resource indicated by the first-level SCI.

The third moment includes but is not limited to any one of the following:

a start symbol of an $x^{th}$ time domain resource in the first resource set indicated by the first-level SCI;

a next symbol following the start symbol of the $x^{th}$ time domain resource in the first resource set indicated by the first-level SCI;

an end symbol of the $x^{th}$ time domain resource in the first resource set indicated by the first-level SCI;

a next symbol following the end symbol of the $x^{th}$ time domain resource in the first resource set indicated by the first-level SCI;

a start symbol of an $x^{th}$ time domain resource in a $y^{th}$ first resource set in the second resource set indicated by the first-level SCI;

a next symbol following the start symbol of the $x^{th}$ time domain resource in the $y^{th}$ first resource set in the second resource set indicated by the first-level SCI;

an end symbol of the $x^{th}$ time domain resource in the $y^{th}$ first resource set in the second resource set indicated by the first-level SCI; or a next symbol following the end symbol of the $x^{th}$ time domain resource in the $y^{th}$ first resource set in the second resource set indicated by the first-level SCI.

The following describes, for different examples, a plurality of manners of determining the first duration value based on the time domain resource of the discontinuous reception DRX active time of the first terminal and/or the time domain resource indicated by the SCI.

First, an association relationship between the DRX configuration information and the time domain resource indicated by the SCI when DRX is configured for the first terminal is described.

Case 1: The reserved time domain resource is a non-periodic resource. In other words, a resource reservation period value T is equal to 0. To be specific, the reserved time domain resource indicated by the SCI includes a first resource set, and the first resource set includes N time domain resources, where N is an integer greater than or equal to 1.

Optionally, the reserved time domain resource is a non-periodic resource, or it may be understood that data transmitted between a terminal device (the second terminal) at a transmit end and a terminal device (the first terminal) at a receive end is non-periodic.

In Case 1, in Example 1, at least one of the N time domain resources in the first resource set is included in a DRX active time. That a time domain resource is included in the DRX active time may be understood as that a start point of the time domain resource is located in the DRX active time, and an end point of the time domain resource is located in the DRX active time.

In specific implementation, Example 1 includes but is not limited to the following Example 1.1 and Example 1.2:

Example 1.1: A first time domain resource of N time domain resources in the first resource set is included in the DRX active time, and N−1 time domain resources other than the first time domain resource may overlap or may not overlap with the DRX active time. This is not required. For example, the first resource set includes three time domain resources, the first time domain resource is included in one DRX active time, and there is no requirement on whether the other two time domain resources are included in the DRX active time.

Example 1.2: First P time domain resources of N time domain resources in the first resource set are included in the DRX active time, and N−P time domain resources other than the P time domain resources may overlap or may not overlap with the DRX active time. This is not required.

Optionally, in this example, N=3 and P=2. To be specific, the first resource set includes three time domain resources, the first time domain resource is included in one DRX active time, the second time domain resource is included in one DRX active time, and there is no requirement on whether the third time domain resource is included in the DRX active time.

In Case 1, in Example 2, first m symbols of at least one of N time domain resources in the first resource set overlap with the DRX active time.

During specific implementation, Example 2 includes but is not limited to the following Example 2.1 and Example 2.2.

Example 2.1: First m symbols of a first time domain resource of the N time domain resources in the first resource set are included in the DRX active time, and first m symbols of N−1 time domain resources other than the first time domain resource may overlap or may not overlap with the DRX active time. This is not required. Optionally, in this example, the first resource set includes three time domain resources, the first m symbols of the first time domain resource are included in one DRX active time, and there is no requirement on whether first m symbols of the other two time domain resources are included in the DRX active time.

Example 2.2: First m symbols of first P time domain resources of the N time domain resources in the first resource set are included in the DRX active time, and first m symbols of N−P time domain resources other than the P time domain resources may overlap or may not overlap with the DRX active time. This is not required. Optionally, in this example, N=3 and P=2. To be specific, the first resource set includes three time domain resources, the first m symbols of the first time domain resource are included in one DRX active time, first m symbols of the second time domain resource are included in one DRX active time, and there is no requirement on whether first m symbols of the third time domain resource are included in the DRX active time.

Case 2: The reserved time domain resource is a periodic resource. In other words, a resource reservation period value T is greater than 0. To be specific, the reserved time domain resource indicated by the SCI includes a second resource set, the second resource set includes a periodic first resource set, and the first resource set includes N time domain resources, where N is an integer greater than or equal to 1.

The reserved time domain resource is a periodic resource, or it may be understood that data transmitted between a terminal device at a transmit end and a terminal device at a receive end is periodic.

In this application, for a periodic resource included in the detected SCI:

When first m symbols of a first time domain resource of an $L^{th}$ resource reservation period overlap with on duration of a next DRX cycle (relative to a current DRX cycle), or the first time domain resource of the $L^{th}$ resource reservation period is included in the on duration of the next DRX cycle, it is referred to as that the $L^{th}$ resource reservation period is aligned with resources of the next DRX cycle, where a value of L is F, F+1, or the like.

When at least first m symbols of a time domain resource are located in a DRX active time, it may be referred to as that the time domain resource is aligned with a resource or a time domain resource of the DRX active time.

The $F^{th}$ resource reservation period is an earliest resource reservation period in several resource reservation periods that are aligned with resources in any DRX cycle other than the first DRX cycle, and a target period is F–1 periods from a first resource reservation period to a $(F-1)^{th}$ resource reservation period. It may also be understood that a first resource in periodic resources that is first aligned with resources in a next DRX cycle is a first resource in the $F^{th}$ period, and the target period is the F–1 periods from the first resource reservation period to the $(F-1)^{th}$ resource reservation period. Alternatively, if the $F^{th}$ resource reservation period is only a resource reservation period that is aligned with resources in any DRX cycle other than the first DRX cycle, the target period is F–1 periods from the first resource reservation period to the $(F-1)^{th}$ resource reservation period. First m symbols of a first resource in the first resource reservation period overlap with the on duration of the current DRX cycle, or the first resource in the first resource reservation period is included in the on duration of the current DRX cycle. If F is an integer greater than or equal to 2, L is also an integer greater than or equal to 2.

For example, when F=2, the target period is a first period. For another example, when F=3, and both the third resource reservation period and the fourth resource reservation period are aligned with any DRX cycle other than the first DRX cycle, the target period is two periods from the first resource reservation period to the second resource reservation period.

For another example, there are five resource reservation periods. At least first m symbols of a first time domain resource in a first resource reservation period are included in the active time. At least first m symbols of a first time domain resource in a second resource reservation period are included in the active time. An overlapping part between any time domain resource in a third time domain reservation period or a fourth time domain reservation period and the active time includes the first m symbols. If at least first m symbols of a first time domain resource in a fifth time domain reservation period are included in the active time, F is 2. The target period is the first resource reservation period. When the second resource reservation period arrives, the fifth time domain reservation period is an earliest resource reservation period for resource alignment, and the target period is three periods from the second resource reservation period to the fourth time domain resource reservation period.

In Case 2, in Example 1, at least one of the N time domain resources in the second resource set in the target period is included in the DRX active time.

The target period herein is at least one period in first Y periods corresponding to the second resource set (or referred to as at least one first resource set in first Y first resource sets included in the second resource set). For example, the target period may be a first period in the first Y periods corresponding to the second resource set, or the first period to a $Y^{th}$ period in the first Y periods corresponding to the second resource set, or the first period to a $Z^{th}$ period in the first Y periods corresponding to the second resource set, or any Z periods in the first Y periods corresponding to the second resource set, where Z is a positive integer less than Y.

Optionally, the target period herein may also be at least one of Y periods corresponding to the second resource set. For example, the target period may be a first period in the Y periods corresponding to the second resource set, or the first period to a $Y^{th}$ period in the Y periods corresponding to the second resource set, or the first period to a $Z^{th}$ period in the Y periods corresponding to the second resource set, or any Z periods in the Y periods corresponding to the second resource set, where Z is a positive integer less than Y.

In specific implementation, Example 1 includes but is not limited to the following Example 1.1 and Example 1.2:

Example 1.1: A first time domain resource of N time domain resources in the second resource set in the target period is included in the DRX active time, and N–1 time domain resources other than the first time domain resource may overlap or may not overlap with the DRX active time. This is not required.

Optionally, in this example, the second resource set includes resources in two periods. The target period is the two periods, and each period includes three time domain resources. The first time domain resource in the target period is included in one active time of the DRX, and there is no requirement on whether the other two time domain resources in the target period are included in the DRX active time.

Example 1.2: First P time domain resources of N time domain resources in the second resource set in the target period are included in the DRX active time, and N–P time domain resources other than the P time domain resources may overlap or may not overlap with the DRX active time. This is not required.

Optionally, in this example, the second resource set includes resources in two periods, the target period is the two periods, N=3, and P=2. To be specific, the target period corresponding to the second resource set includes three time domain resources, the first time domain resource in the target period is included in one DRX active time, the second time domain resource in the target period is included in one DRX active time, and there is no requirement on whether the third time domain resource in the target period is included in the DRX active time.

In Case 2, in Example 2, first m symbols of at least one of N time domain resources in the second resource set in the target period overlap with the DRX active time.

During specific implementation, Example 2 includes but is not limited to the following Example 2.1 and Example 2.2.

Example 2.1: First m symbols of a first time domain resource of the N time domain resources in the second resource set in the target period are included in the DRX active time, and first m symbols of N−1 time domain resources other than the first time domain resource may overlap or may not overlap with the DRX active time. This is not required.

In this application, m in the first m symbols of the first time domain resource of the N time domain resources in the target period may be the same or different for any time domain resource. This is not limited. In other words, m in the first m symbols of the first time domain resource of the N time domain resources in the target period may be completely the same, partially the same, partially different, or completely different for any time domain resource. Similarly, the first m symbols of N−1 time domain resources other than the first time domain resource also comply with the foregoing rule.

Example 2.2: First m symbols of first P time domain resources of the N time domain resources in the second resource set in the target period are included in the active time, and first m symbols of N−P time domain resources other than the P time domain resources may overlap or may not overlap with the active time. This is not required.

In this application, m in the first m symbols of the first P time domain resources of the N time domain resources in the target period may be the same or different for any time domain resource. This is not limited. In other words, m in the first m symbols of the first P time domain resources of the N time domain resources in the target period may be completely the same, partially the same, partially different, or completely different for any time domain resource. Similarly, the first m symbols of N−P time domain resources other than the P time domain resources also comply with the foregoing rule.

In this application, P is a positive integer less than or equal to N, and m is greater than or equal to 1, and less than or equal to a maximum quantity of symbols included in one slot/subframe. Optionally, when one slot includes 14 symbols, m is less than or equal to 14. When one slot includes 12 symbols, m is less than or equal to 12.

Optionally, in this example, the second resource set includes resources in two periods, the target period is the two periods, N=3, and P=2. To be specific, each period corresponding to the second resource set includes three time domain resources, first m symbols of the first time domain resource in the target period is included in one active time, first m symbols of the second time domain resource in the target period is included in one active time, and there is no requirement on whether first m symbols of the third time domain resource in the target period are included in the active time.

It should be noted that in Case 1 and Case 2, first m symbols of one time domain resource are required to overlap with the DRX active time because the terminal device at the transmit end generally adds SCI to one or more symbols preceding each time domain resource. Therefore, it only needs to be ensured that the terminal device at the receive end remains in the active time in the first m symbols of one time domain resource, so that the terminal device at the receive end can detect the SCI. Therefore, data can be correctly received or sent based on control information carried in the SCI. Optionally, when detecting the SCI, the terminal device at the receive end may start the first timer, to ensure that the terminal device at the receive end stays in the active time during a working period of the first timer. Therefore, data can be correctly received or sent. In other words, it may be understood that the SCI is located in the first m symbols of one time domain resource. When the SCI is two-level SCI, first-level SCI may be located in the first m symbols of one time domain resource, or both the first-level SCI and second-level SCI are located in the first m symbols of one time domain resource.

The following describes the foregoing content with reference to a specific example. A specific process in which the first terminal determines the first duration value based on the discontinuous reception configuration information of the first terminal and/or the time domain resource indicated by the SCI in step 302 is described in detail. The discontinuous reception configuration information of the first terminal is the discontinuous reception duration of the first terminal. Specifically, at least one of the following may be included: The second terminal also determines the first duration value in a same manner, and sends the first duration value to the first terminal.

The first terminal determines the first duration value based on the discontinuous reception duration of the first terminal and/or the time domain position of the time domain resource indicated by the SCI.

Alternatively, the first terminal determines the first duration value based on whether the discontinuous reception duration of the first terminal completely overlaps with the time domain resource indicated by the SCI.

Alternatively, the first terminal determines the first duration value based on a degree of overlapping between the discontinuous reception duration of the first terminal and the time domain resource indicated by the SCI.

A relationship between the discontinuous reception duration of the first terminal and the time domain position of the time domain resource indicated by the SCI may be any one of the following: The time domain position of the time domain resource indicated by the SCI is completely located in the discontinuous reception duration of the first terminal, at least first m symbols (or referred to as time domain positions corresponding to the at least first m symbols) of the time domain resource indicated by the SCI are located in the discontinuous reception duration of the first terminal, or at least first m symbols (or referred to as time domain positions corresponding to the at least first m symbols) of the first time domain resource indicated by the SCI are located in the discontinuous reception duration of the first terminal, and at least first m symbols of a time domain resource other than one time domain resource are not located in the discontinuous reception duration of the first terminal.

For a time domain resource, when the time domain resource overlaps with the DRX active time, a degree of overlapping of the time domain resource may include any one of the following examples:

In an example, that the time domain resource (or the time domain position of the time domain resource) is completely located in the active time may also be understood as that both a start point and an end point of the time domain resource are located in the active time, or may be understood as that the time domain resource completely overlaps with the active time.

In an example, that at least first m symbols of the time domain resource are located in the active time may also be understood as that a start point of the time domain resource is located in the active time, and an end point of the time domain resource is not located in the active time. Alternatively, it may be understood as that there is an overlapping part between the time domain resource and the active time, but the overlapping part is not completely overlapped.

In an example, an overlapping part between the time domain resource and a DRX active time does not include the at least first m symbols of the time domain resource. If the start point of the time domain resource is within the active time, and the end point of the time domain resource is not within the active time, it may also be understood that there is an overlapping part between the time domain resource and the active time, but the overlapping part is not completely overlapped. If the start point of the time domain resource is not within the active time, and the end point of the time domain resource is not within the active time, it may also be understood that the time domain resource and the active time do not overlap, or it may be understood that the time domain resource and the active time do not overlap at all.

If the SCI indicates a time domain resource, any one of whether the discontinuous reception duration of the first terminal completely overlaps with the time domain resource indicated by the SCI and a degree of overlapping may be: The time domain resource (or the time domain position of the time domain resource) is completely located in the active time, at least first m symbols of the time domain resource are located in the active time, an overlapping part between the time domain resource and the DRX active time does not include the at least first m symbols of the time domain resource, or no symbol of the time domain resource is located in the active time.

If the SCI indicates a plurality of time domain resources, for whether the discontinuous reception duration of the first terminal completely overlaps with the time domain resource indicated by the SCI, and a degree of overlapping, refer to the following description.

That the plurality of time domain resources (or time domain positions of the time domain resources) indicated by the SCI are completely located in the active time may also be understood as that start points and end points of the plurality of time domain resources are all located in the active time, or may be understood as that the plurality of time domain resources completely overlap with the active time. In other cases, the plurality of time domain resources partially overlap with the active time because the first time domain resource overlaps with the active time. Therefore, when a plurality of time domain resources are implemented in the SCI, there is no case in which the plurality of time domain resources do not overlap with the DRX active time at all.

When the discontinuous reception duration of the first terminal completely overlaps with the time domain resource indicated by the SCI (that is, the time domain resource or the time domain position of the time domain resource is completely located in the active time), a duration value may be selected from the duration value set as the first duration value. Alternatively, the first duration value may be determined based on the third moment and the second moment, where X in the third moment is less than or equal to N, and a value of Y is not limited. For example, when the first resource set includes one time domain resource, X is 1. When the first resource set includes two time domain resources, X is 1 or 2. Alternatively, when the first resource set includes three time domain resources, X is 1, 2, or 3. In any embodiment of this application, optionally, the selecting a duration value in the duration value set as the first duration value may be selecting, from the duration value set, a minimum duration value greater than or equal to a difference between the third moment and the second moment as the first duration value.

The following describes in detail an example of Case 1 in the foregoing embodiment.

In Example 1 in Case 1 in the foregoing embodiment, at least one of N time domain resources in the first resource set is included in a DRX active time.

Example 1.1: A first time domain resource of N time domain resources in the first resource set is included in the DRX active time, and N−1 time domain resources other than the first time domain resource may overlap or may not overlap with the DRX active time. This is not required. N−1 is a positive integer greater than or equal to 1.

In Example 2 in Case 1 in the foregoing embodiment, first m symbols of at least one of N time domain resources in the first resource set overlap with the DRX active time.

Example 2.1: First m symbols of a first time domain resource of the N time domain resources in the first resource set are included in the DRX active time, and first m symbols of N−1 time domain resources other than the first time domain resource may overlap or may not overlap with the DRX active time. This is not required. N−1 is a positive integer greater than or equal to 1.

In one case, the N−1 time domain resources other than the first time domain resource in Example 1.1 overlap with the DRX active time, and an overlapping part includes at least first m symbols of the N−1 time domain resources. In another case, in Example 2.1, the first m symbols of the N−1 time domain resources other than the first time domain resource overlap with the DRX active time. In the two cases, a duration value may be selected from the duration value set as the first duration value. Alternatively, the first duration value may be determined based on the third moment and the second moment, where x in the third moment is less than or equal to N. For example, when the first resource set includes one time domain resource, x is 1. When the first resource set includes two time domain resources, x is 1 or 2. Alternatively, when the first resource set includes three time domain resources, x is 1, 2, or 3. For a process of determining the first duration value based on the third moment and the second moment, refer to the descriptions in the foregoing embodiments. For example, the difference between the third moment and the second moment is determined as the first duration value. For another example, a sum of the difference between the third moment and the second moment plus a first parameter is determined as the first duration value. For still another example, a minimum quantity of slots greater than or equal to the difference between the third moment and the second moment is determined as the first duration value. Optionally, the selecting a duration value in the duration value set as the first duration value may be selecting, from the duration value set, a minimum duration value greater than or equal to a difference between the third moment and the second moment as the first duration value.

In an example, when x is 1, the second moment is a start point of the first time domain resource, and the third moment is an end point of the first time domain resource. The first duration value obtained by subtracting the second moment from the third moment may also be referred to as a duration value of one time domain resource. When x is 2, the second moment is a start point of the first time domain resource, and the third moment is an end point of a second time domain resource. The first duration value obtained by subtracting the second moment from the third moment may also be referred to as a duration value of two time domain resources.

Figure 6A:
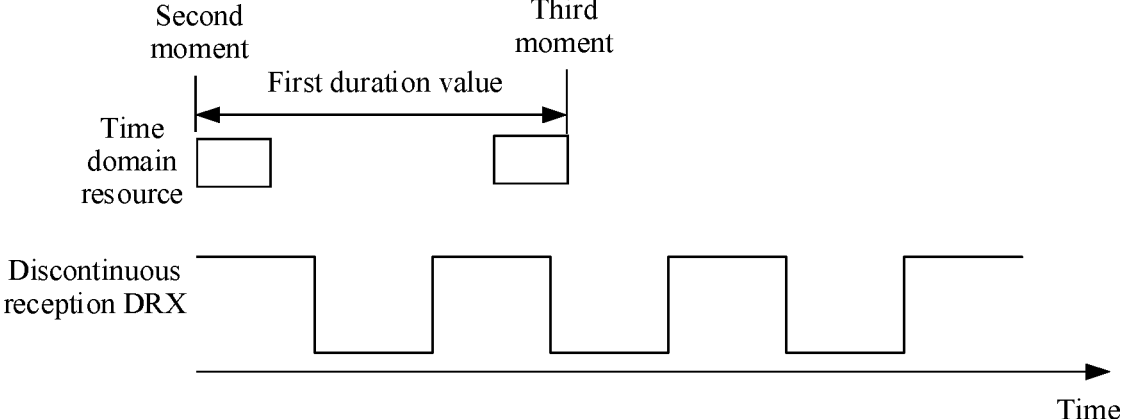
FIG. 6a is a schematic diagram of comparison between a time domain resource indicated by an SCI and DRX according to an embodiment of this application.

As shown in FIG. 6a, a time domain resource indicated by the SCI includes a first resource set. The first resource set includes two time domain resources, the first time domain resource is completely included in the DRX active time, and an overlapping part between the second time domain resource and the DRX active time includes at least first m symbols. In this case, the second moment is a start point of the first time domain resource, and the third moment is an end point of the second time domain resource, the first duration value obtained by subtracting the second moment from the third moment may also be referred to as a duration value of two time domain resources.

In one case, in Example 1.1, none of N–1 time domain resources other than the first time domain resource overlap with the DRX active time, or an overlapping part between the N–1 time domain resources and the DRX active time does not include the at least first m symbols of the N–1 time domain resources. In another case, in Example 2.1, the first m symbols of the N–1 time domain resources other than the first time domain resource do not overlap with the DRX active time, or an overlapping part between the N–1 time domain resources and the DRX active time does not include the at least first m symbols of the N–1 time domain resources. In the two cases, to completely receive the $N^{th}$ time domain resource in the first resource set, an end point of the $N^{th}$ time domain resource needs to be in the active time. In the two cases, a duration value may be selected from the duration value set as the first duration value. The selected duration value is a minimum duration value greater than or equal to the difference between the third moment and the second moment, where x in the third moment is equal to N. Alternatively, the first duration value may be determined based on the third moment and the second moment, where x in the third moment is equal to N. In an example, in this case, the second moment may be set to a start point of the first time domain resource, the third moment may be set to an end point of the $N^{th}$ time domain resource, and a difference between the start point of the first time domain resource and the end point of the $N^{th}$ time domain resource is determined as the first duration value.

Figure 6B:
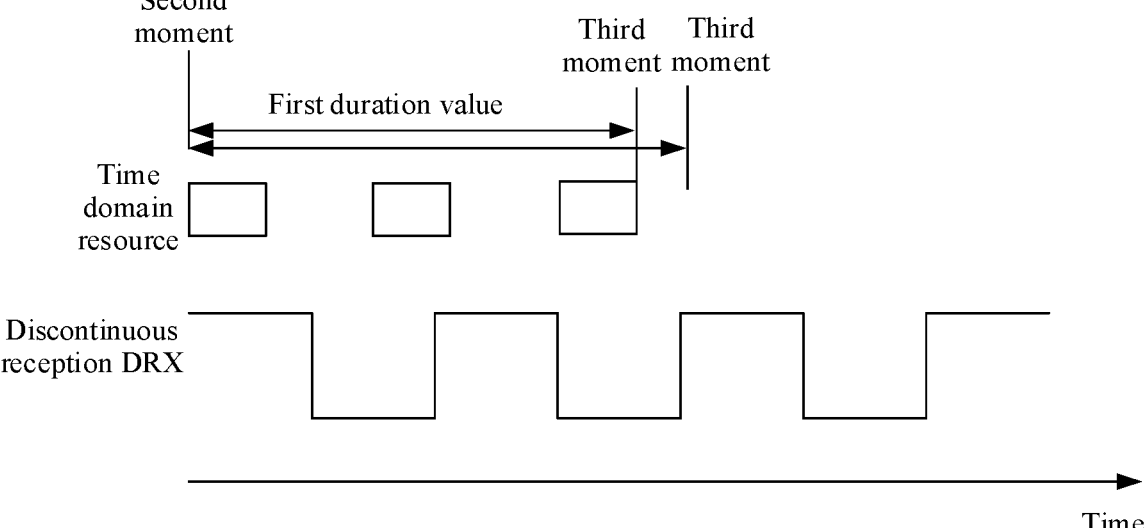
FIG. 6b is a schematic diagram of comparison between another time domain resource indicated by an SCI and DRX according to an embodiment of this application.

As shown in FIG. 6*b*, a time domain resource indicated by the SCI includes a first resource set. The first resource set includes three time domain resources, the first time domain resource is completely included in the DRX active time, and an overlapping part between a second time domain resource and a third time domain resource and the DRX active time does not include first m symbols. In this case, the first duration value is determined based on the third moment and the second moment, where x=3 in the third moment. In other words, the $x^{th}$ resource in the third moment is a third resource. For specific descriptions of the third moment and the second moment, refer to the foregoing description. In an embodiment, the second moment may be a start point of the first time domain resource, and the third moment is an end point of the third time domain resource or a moment following the end point of the third time domain resource.

In Example 1 in Case 1 in the foregoing embodiment, in Example 1.2, first P time domain resources of N time domain resources in the first resource set are included in the DRX active time, and N–P time domain resources other than the P time domain resources may overlap or may not overlap with the DRX active time. This is not required. N–P is a positive integer greater than or equal to 1.

In Example 2 in Case 1 in the foregoing embodiment, in Example 2.2, first m symbols of first P time domain resources of the N time domain resources in the first resource set are included in the DRX active time, and first m symbols of N–P time domain resources other than the P time domain resources may overlap or may not overlap with the DRX active time. This is not required. N–P is a positive integer greater than or equal to 1.

In one case, N–P time domain resources other than the P time domain resources in Example 1.2 overlap with the DRX active time, and an overlapping part includes at least first m symbols of the N–P time domain resources. In another case, in Example 2.2, the first m symbols of N–P time domain resources other than the P time domain resources overlap with the DRX active time. In the two cases, for any one of first P–1 time domain resources, a duration value may be selected from the duration value set as the first duration value. Alternatively, the first duration value may be determined based on the third moment and the second moment, where x in the third moment is less than or equal to P–1. Because the P–1 time domain resources are aligned with the active time (on duration), corresponding SCI may be detected by the time domain resource itself. In this case, the first duration value may be determined in any manner to receive the data. Certainly, the first duration value may also be determined directly based on the SCI detected for the first time. For example, the first duration value is determined by using the difference between the third moment and the second moment. In an example, the second moment is a start point of the first time domain resource, and the third moment is an end point of an $N^{th}$ time domain resource. All subsequent time domain resources need to trigger the timer based on a $P^{th}$ time domain resource to receive the time domain resource. For the $P^{th}$ time domain resource, a duration value may be selected from the duration value set as the first duration value. The selected duration value is a minimum duration value greater than or equal to the difference between the third moment and the second moment, where x in the third moment is equal to N. Alternatively, the first duration value may be determined based on the third moment and the second moment, where x in the third moment is equal to N. The resources following the $P^{th}$ time domain resource cannot be aligned with the on duration. Therefore, only the SCI detection of the $P^{th}$ time domain resource is required, and a timer that can receive the last data is started. For a process of determining the first duration value based on the third moment and the second moment, refer to the descriptions in the foregoing embodiments. For example, the difference between the third moment and the second moment is determined as the first duration value. For another example, a sum of the difference between the third moment and the second moment plus a first parameter is determined as the first duration value. For still another example, a minimum quantity of slots greater than or equal to the difference between the third moment and the second moment is determined as the first duration value. In an example, in this case, the second moment may be set to a start point of the $P^{th}$ time domain resource, the third moment may be set to an end point of the $N^{th}$ time domain resource, and a difference between the end point of the $N^{th}$ time domain resource and the start point of the $P^{th}$ time domain resource is determined as the first duration value. In an example, p is 2. In this case, the second moment may be set to a start point of the second time domain resource, the third moment may be set to an end point of the $N^{th}$ time domain resource, and a difference between the end point of the $N^{th}$ time domain resource and the start point of the second time domain resource is determined as the first duration value.

Figure 6C:
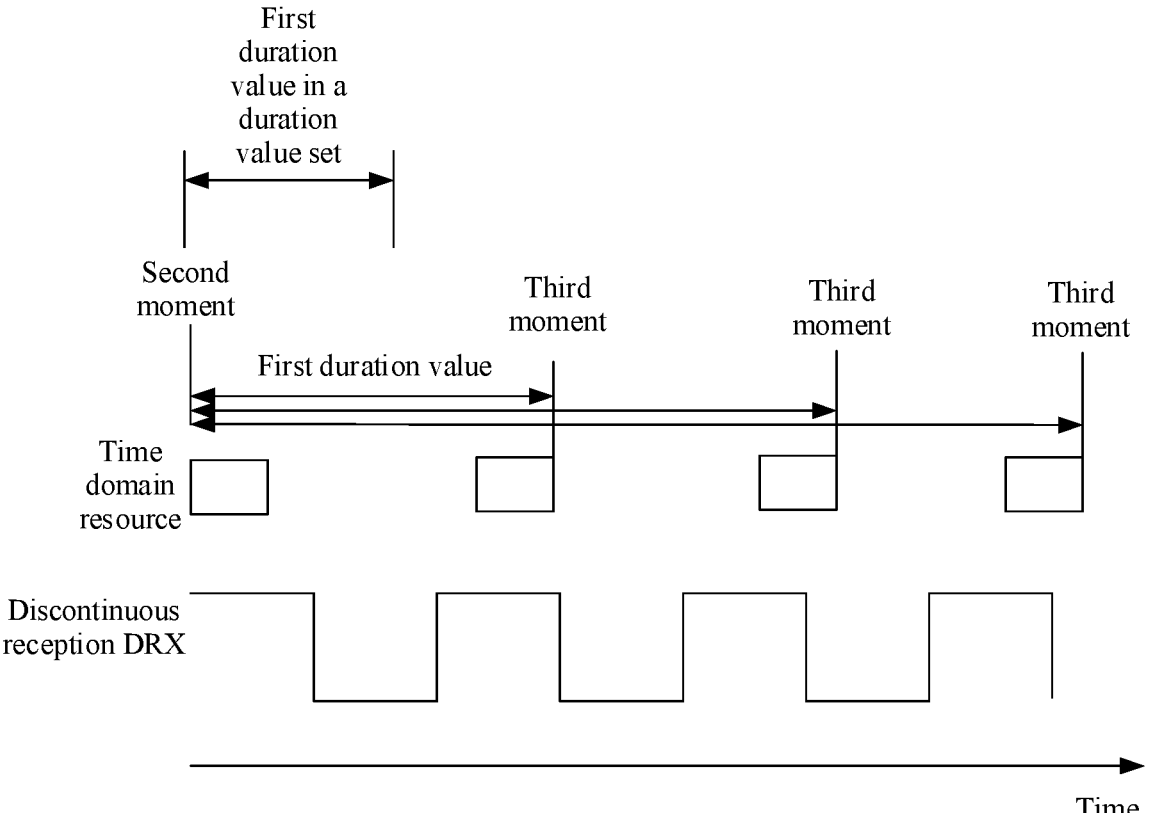
FIG. 6c is a schematic diagram of comparison between still another time domain resource indicated by an SCI and DRX according to an embodiment of this application.

As shown in FIG. 6*c*, N is 4, and P is 2. The time domain resource indicated by the SCI includes a first resource set. The first resource set includes four time domain resources, the first two time domain resources are completely located in the DRX active time, and an overlapping part between the last two time domain resources and the DRX active time includes the at least first m symbols. In this example, the second moment is a start point of the first time domain resource, and the third moment is an end point of the first time domain resource, an end point of the second time domain resource, an end point of the third time domain resource, or an end point of the fourth time domain resource. Alternatively, a duration value is selected from the duration value set as the first duration value.

In one case, in Example 1.2, none of N–P time domain resources other than the P time domain resources overlap with the DRX active time, or an overlapping part between the N–P time domain resources and the DRX active time does not include the at least first m symbols of the N–P time domain resources. In another case, in Example 2.2, the first m symbols of the N–P time domain resources other than the P time domain resources do not overlap with the DRX active time. The two cases may be the same as Example 1.1. To completely receive the $N^{th}$ time domain resource in the first resource set, an end point of the $N^{th}$ time domain resource needs to be in the active time. In this case, the second moment may be set to a start point of the first time domain resource, the third moment may be set to an end point of the $N^{th}$ time domain resource, and a difference between the start point of the first time domain resource and the end point of the $N^{th}$ time domain resource is determined as the first duration value.

Figure 6D:
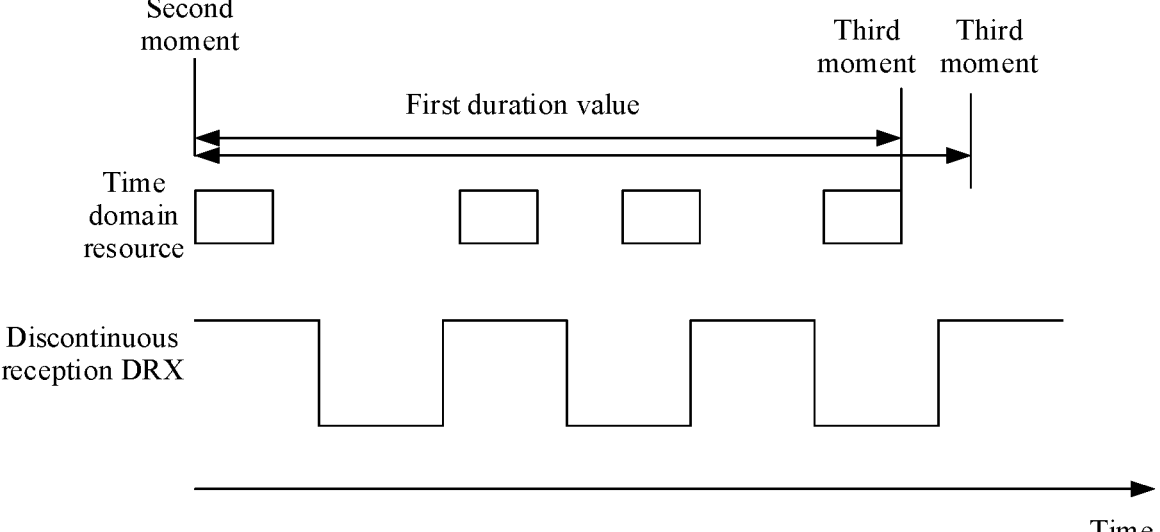
FIG. 6d is a schematic diagram of comparison between yet another time domain resource indicated by an SCI and DRX according to an embodiment of this application.

As shown in FIG. 6d, N is 4, and P is 2. The time domain resource indicated by the SCI includes a first resource set. The first resource set includes four time domain resources, the first two time domain resources are completely included in the DRX active time, and an overlapping part between the last two time domain resources and the DRX active time does not include the first m symbols. In this case, the first duration value is determined based on the third moment and the second moment, where x=4 in the third moment. In other words, the $x^{th}$ resource in the third moment is a fourth time domain resource. For specific descriptions of the third moment and the second moment, refer to the foregoing description. In an embodiment, the second moment may be a start point of the first time domain resource, and the third moment is an end point of the fourth time domain resource or a moment following the end point of the fourth time domain resource.

Explanations of the m symbols in this embodiment are the same as those in the foregoing embodiments. In other words, explanations of any embodiment of this application are also applicable to other embodiments, and details are not described again.

In addition, in still another case, when the first resource set includes at least three time domain resources (N is greater than or equal to 3), an overlapping part between the first time domain resource and the DRX active time includes the first m symbols of the first time domain resource, an overlapping part between an $i^{th}$ time domain resource and the DRX active time does not include first m symbols of the $i^{th}$ time domain resource, and an overlapping part between an $(i+1)^{th}$ time domain resource and the DRX active time includes first m symbols of the $(i+1)^{th}$ time domain resource, where i is an integer greater than or equal to 2, and i is an integer less than or equal to N–1. In this case, the second moment may be a start point of the first time domain resource, and the third moment may be an end point of the $i^{th}$ time domain resource, or the third moment is a moment following the end point of the $i^{th}$ time domain resource.

Figure 6E:
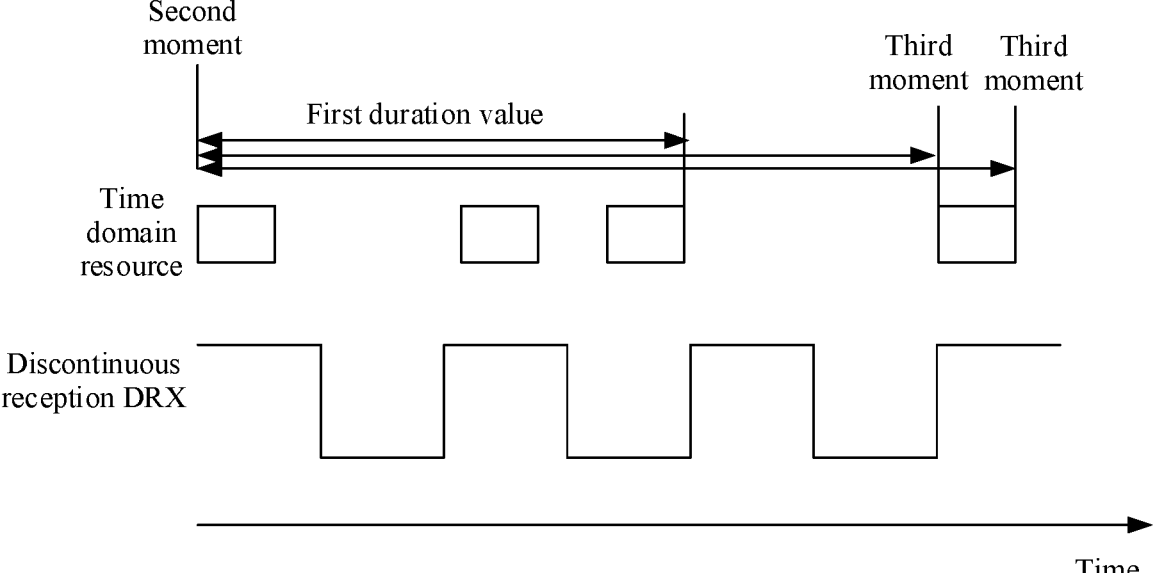
FIG. 6e is a schematic diagram of comparison between still yet another time domain resource indicated by an SCI and DRX according to an embodiment of this application.

As shown in FIG. 6e, N is 4, and i is 3. The first resource set includes four time domain resources. An overlapping part between the first two time domain resources and the DRX active time includes the at least first m symbols, an overlapping part between the third time domain resource and the DRX active time does not include the first m symbols of the third time domain resource, and an overlapping part between the fourth time domain resource and the DRX active time includes the first m symbols of the fourth time domain resource. In this case, the second moment may be a start point of the first time domain resource, and the third moment may be an end point of the third time domain resource, or the third moment is a moment following the end point of the third time domain resource, for example, a start point or an end point of the fourth time domain resource.

When an overlapping part between a time domain resource of an $i^{th}$ piece of data in the first resource set and the DRX active time includes at least first m symbols, and an overlapping part between a time domain resource of an $(i+1)^{th}$ piece of data and the DRX active time includes the at least first m symbols, SCI in the $i^{th}$ time domain resource is received. In this case, when the SCI in the $i^{th}$ time domain resource is detected, a first duration value of the started first timer may be determined by using the following method. For example, a duration value may be selected from the duration value set as the first duration value. Alternatively, the first duration value may be determined based on the third moment and the second moment, where x in the third moment is less than or equal to N. For example, when the first resource set includes one time domain resource, x is 1. When the first resource set includes two time domain resources, x is 1 or 2. Alternatively, when the first resource set includes three time domain resources, x is 1, 2, or 3. For a process of determining the first duration value based on the third moment and the second moment, refer to the descriptions in the foregoing embodiments.

When an overlapping part between a time domain resource of an $i^{th}$ piece of data in the first resource set and the DRX active time includes at least first m symbols, an overlapping part between a time domain resource of an $(i+1)^{th}$ piece of data and the DRX active time does not include the at least first m symbols, and SCI in the $i^{th}$ time domain resource is received, a first duration value may be determined based on the second moment and the third moment. The second moment may be a start point of the $i^{th}$ time domain resource, and the third moment may be an end point of the $(i+1)^{th}$ time domain resource. If an overlapping part between an $(i+_2)^{th}$ time domain resource and the DRX active time does not include the at least first m symbols, the third moment may be an end point of the $(i+2)^{th}$ time domain resource. In conclusion, the third moment may be an end point of an $(x+r)^{th}$ time domain resource, and none of overlapping parts between the $(i+1)^{th}$ time domain resource to an $(i+r)^{th}$ time domain resource and the DRX active time include the at least first m symbols, where r is an integer greater than or equal to 0. Optionally, the selecting a duration value in the duration value set as the first duration value may be selecting, from the duration value set, a minimum duration value greater than or equal to a difference between the third moment and the second moment as the first duration value.

Figure 6F:
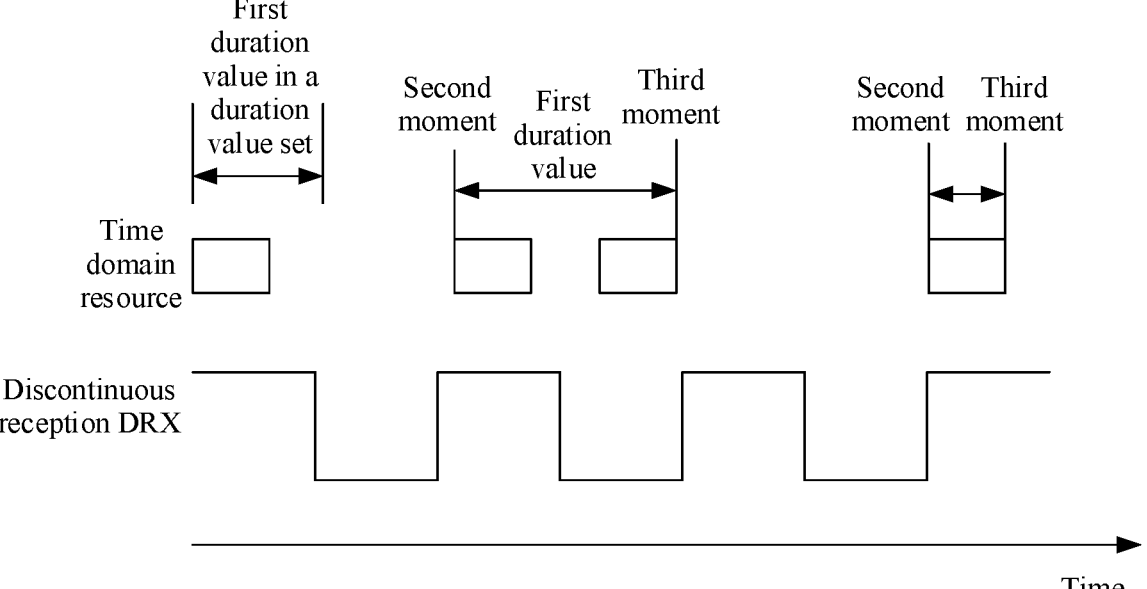
FIG. 6f is a schematic diagram of comparison between a further time domain resource indicated by an SCI and DRX according to an embodiment of this application.

As shown in FIG. 6f, the first resource set includes four time domain resources. An overlapping part between the first two time domain resources and the DRX active time includes the at least first m symbols, an overlapping part between the third time domain resource and the DRX active time does not include the first m symbols of the third time domain resource, and an overlapping part between the fourth time domain resource and the DRX active time includes the first m symbols of the fourth time domain resource. In this case, starting from the start point of the first time domain resource, the first duration value is a duration value in the duration value set. Then, the first duration value of the first timer is a duration value from the start point of the second time domain resource to the end point of the third time domain resource. Then, the first duration value of the first timer is a duration value from the start point of the fourth time domain resource to the end point of the fourth time domain resource.

Figure 7A:
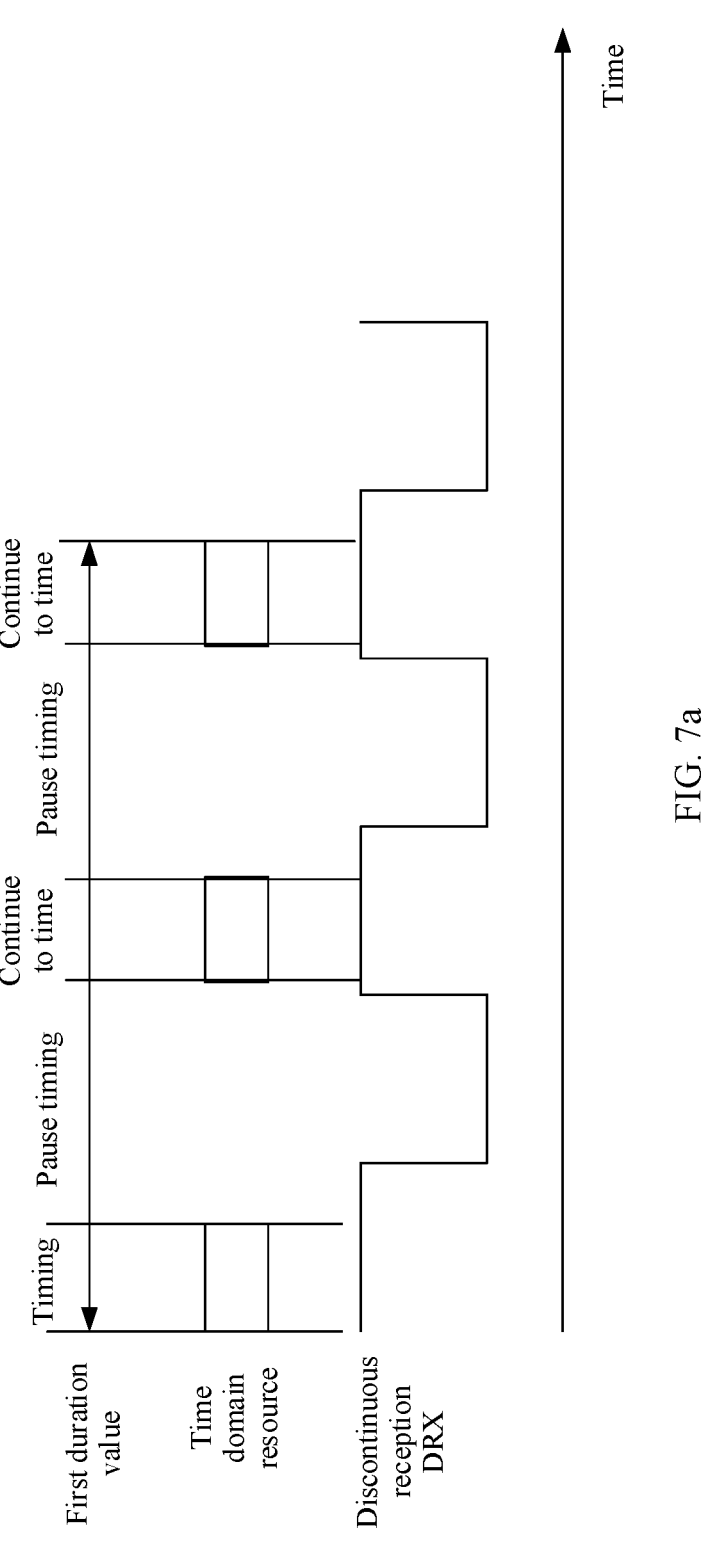
FIG. 7a is a schematic diagram of comparison between a still further time domain resource indicated by an SCI and DRX according to an embodiment of this application.

With reference to FIG. 7a, the following further describes a method for determining the first duration value. The first duration value may be a discontinuous duration value. The "discontinuous" means that the first duration value matches a corresponding time domain resource, or may be understood as that timing of the first duration value matches a corresponding time domain resource. Optionally, the corresponding time domain resource is a resource that is in the reserved time domain resource and that is used for initial data transmission, or the corresponding time domain resource is a first time domain resource of each second resource set in the reserved time domain resource. The "discontinuous" may be understood as during the active time (the first timer is timing) at least in time domain occupied by the reserved time domain resource, and/or as during an inactive time (the first timer pauses timing) in time domain not occupied by the reserved time domain resource. Alternatively, it may be understood as during the active time at least in time domain occupied by the reserved time domain resource.

It may be understood that the first terminal is in the active time in the time domain occupied by the time domain resource indicated by the SCI, and/or the first terminal is in the inactive time in the time domain not occupied by the time domain resource indicated by the SC. In this application, that the SCI indicates a sidelink time domain resource may also be referred to as that the SCI indicates a reserved sidelink time domain resource.

As shown in FIG. 7a, the first resource set includes three time domain resources, and a duration value of the first timer is a duration value from a start point of a first time domain resource to an end point of a third time domain resource. The first timer starts timing at the start point of the first time domain resource, pauses timing at an end point of the first time domain resource, continues to time at a start point of a second time domain resource, pauses timing at an end point of the second time domain resource, continues to time at a start point of the third time domain resource, and pauses timing at the end point of the third time domain resource.

For example, if the first time domain resource occupies 2 ms, the second time domain resource occupies 2 ms, and the third time domain resource occupies 3 ms, the first timer counts 7 ms at the end point of the third time domain resource.

The following describes a case in which a time domain resource is reserved periodically.

Because a reserved resource in a first period (namely, a first time domain resource reservation period) is included in the active time of the DRX cycle, but a reserved resource in a second period does not overlap with the active time of the DRX cycle, the terminal device at the receive end is in the sleep time at a time corresponding to the reserved resource in the second period, and cannot use the reserved resource in the second period. In addition, if the terminal device at the receive end uses the first timer configured by the network device, that is, uses the preconfigured fixed-duration timer, the terminal device at the receive end may not enable the reserved resource in the second period to overlap with the active time of the DRX cycle. In this case, the terminal device at the receive end determines duration of a drx- Inactivity Timer. For example, if only the first time domain resource of the second period needs to be included in the active time of the DRX cycle, the duration of the first timer needs to be equal to a sum of the duration of the resource reservation period T and the duration of the first time domain resource of the second period. Certainly, if both the first time domain resource and the second time domain resource of the second period are required to be included in the active time of the DRX cycle, the duration of the second timer is required to be equal to a sum of the duration of the resource reservation period T and duration between a start moment of the first time domain resource of the second period and an end moment of the second resource.

Optionally, with reference to the foregoing explanations about resource alignment, it is assumed that the target period is $F-1$ periods from the first resource reservation period to the $(F-1)$th resource reservation period. In this case, $y=F-1$ and $x=1$ at a third moment; or $y=F-1$ and $x=N$ at the third moment. For a specific difference between the third moment and the second moment, refer to the foregoing descriptions of various start symbols and end symbols. Details are not described again. For example, the third moment is an end point of a first time domain resource or an $N^{th}$ time domain resource in a $(F-1)^{th}$ first resource set in the second resource set, and the second moment is a start point of a first time domain resource in a $1^{st}$ first resource set in the second resource set.

The following describes in detail an example of Case 2 in the foregoing embodiment.

In Example 1 in Case 2 in the foregoing embodiment, at least one of the N time domain resources in the second resource set in the target period is included in the DRX active time.

Example 1.1: A first time domain resource of N time domain resources in the second resource set in the target period is included in the DRX active time, and $N-1$ time domain resources other than the first time domain resource may overlap or may not overlap with the DRX active time. This is not required. $N-1$ is a positive integer greater than or equal to 1.

In Example 2 in Case 2 in the foregoing embodiment, first m symbols of at least one of N time domain resources in the second resource set in the target period overlap with the DRX active time.

Example 2.1: First m symbols of a first time domain resource of the N time domain resources in the second resource set in the target period are included in the DRX active time, and first m symbols of $N-1$ time domain resources other than the first time domain resource may overlap or may not overlap with the DRX active time. This is not required. $N-1$ is a positive integer greater than or equal to 1.

In one case, the $N-1$ time domain resources other than the first time domain resource in Example 1.1 overlap with the DRX active time, and an overlapping part includes at least first m symbols of the $N-1$ time domain resources. In another case, in Example 2.1, the first m symbols of the $N-1$ time domain resources other than the first time domain resource overlap with the DRX active time. In the two cases, a duration value may be selected from a duration value set as the first duration value. Alternatively, the first duration value may be determined based on the third moment and the second moment, where x in the third moment is less than or equal to N, y is less than or equal to $F-1$. The $F^{th}$ resource reservation period (the first resource set) is an earliest resource reservation period in several resource reservation periods (the first resource set) aligned with resources in any DRX cycle other than the first DRX cycle (the first resource set).

For example, when the first resource set includes one time domain resource, x is 1. When the first resource set includes two time domain resources, x is 1 or 2. Alternatively, when the first resource set includes three time domain resources, x is 1, 2, or 3. For example, when the second resource set includes two first resource sets, F−1 may be 1. When the second resource set includes three first resource sets, F−1 is 1 or 2. For a process of determining the first duration value based on the third moment and the second moment, refer to the descriptions in the foregoing embodiments. For example, the difference between the third moment and the second moment is determined as the first duration value. For another example, a sum of the difference between the third moment and the second moment plus a first parameter is determined as the first duration value. For still another example, a minimum quantity of slots greater than or equal to the difference between the third moment and the second moment is determined as the first duration value.

As shown in FIG. 7a, the time domain resource indicated by the SCI includes a second resource set, the second resource set includes a periodic first resource set, and the first resource set includes two time domain resources. The first time domain resource in the two first resource sets is completely included in the DRX active time, and an overlapping part between the second time domain resource in the two first resource sets and the DRX active time includes the at least first m symbols. In this case, the second moment is a start point of a first time domain resource in the $1^{st}$ first resource set, the third moment is an end point of a second time domain resource in the $1^{st}$ first resource set, and an end point of a second time domain resource in a $2^{nd}$ first resource set.

In one case, in Example 1.1, none of N−1 time domain resources other than the first time domain resource overlap with the DRX active time, or an overlapping part between the N−1 time domain resources and the DRX active time does not include the at least first m symbols of the N−1 time domain resources. In another case, in Example 2.1, the first m symbols of the N−1 time domain resources other than the first time domain resource do not overlap with the DRX active time, or an overlapping part between the N−1 time domain resources and the DRX active time does not include the at least first m symbols of the N−1 time domain resources. In the two cases, to completely receive the $N^{th}$ time domain resource in the first resource set, an end point of the $N^{th}$ time domain resource needs to be in the active time. In the two cases, a duration value may be selected from a duration value set as the first duration value. The selected duration value is a minimum duration value greater than or equal to a difference between a third moment and a second moment, where x in the third moment is equal to 1 or N, y is equal to F−1. The $F^{th}$ resource reservation period (the first resource set) is an earliest resource reservation period in several resource reservation periods (the first resource set) aligned with resources in any DRX cycle other than the first DRX cycle (the first resource set). Alternatively, the first duration value may be determined based on the third moment and the second moment, where x in the third moment is equal to 1 or N, and y=F−1. In an example, in this case, the second moment may be set to a start point of the first time domain resource in the $1^{st}$ first resource set, the third moment may be set to an end point of an $N^{th}$ time domain resource in a $(F-1)^{th}$ first resource set, and a difference between the start point of the first time domain resource in the $1^{st}$ first resource set and the end point of the $N^{th}$ time domain resource in the $(F-1)^{th}$ first resource set as the first duration value.

Figures 7B, 7C:
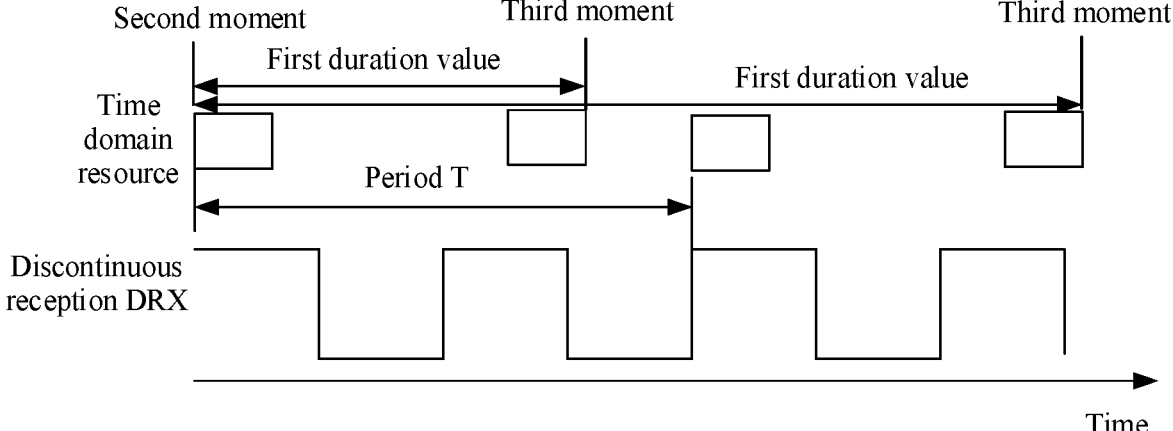
FIG. 7b is a schematic diagram of comparison between a yet further time domain resource indicated by an SCI and DRX according to an embodiment of this application.
FIG. 7c is a schematic diagram of comparison between a still yet further time domain resource indicated by an SCI and DRX according to an embodiment of this application.

As shown in FIG. 7b, a time domain resource indicated by SCI includes a second resource set. The second resource set includes two first resource sets, and the first resource set includes three time domain resources. First time domain resources in the two first resource sets are completely included in the DRX active time, and an overlapping part between a second time domain resource and a third time domain resource in the two first resource sets and the DRX active time does not include the first m symbols. Three time domain resources in the $2^{nd}$ first resource set are completely included in the DRX active time. In this case, the first duration value is determined based on the third moment and the second moment, where x=3 in the third moment, that is, the xth resource in the third moment is the third resource, and y=2 in the third moment, that is, the yth first resource set in the third moment is the $2^{nd}$ first resource set. For specific descriptions of the third moment and the second moment, refer to the foregoing description. In an embodiment, the second moment may be a start point of the first time domain resource in the $1^{st}$ first resource set, and the third moment is an end point of a third time domain resource in the $2^{nd}$ first resource set or a moment following the end point of a third time domain resource in the $2^{nd}$ first resource set. Alternatively, the third moment may be an end point of a first time domain resource in the $2^{nd}$ first resource set. When the third moment is set to the end point of the first time domain resource in the $2^{nd}$ first resource set, another time domain resource in the $2^{nd}$ first resource set may be received based on the retransmission timer.

Figure 7D:
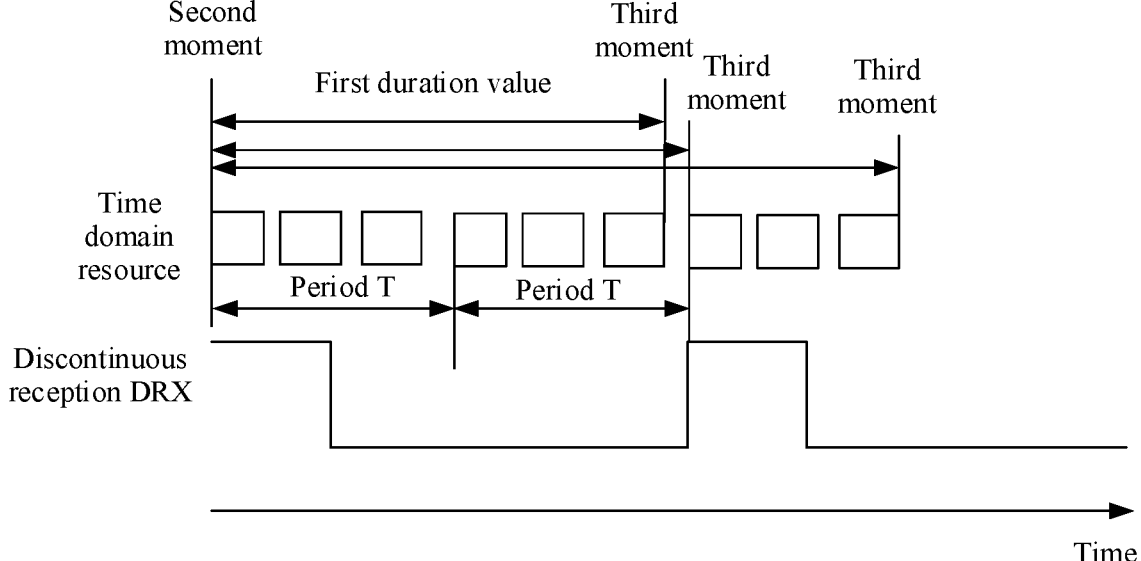
FIG. 7d is a schematic diagram of comparison between even yet another time domain resource indicated by an SCI and DRX according to an embodiment of this application.

As shown in FIG. 7d, the second resource set includes three first resource sets, and the first resource set includes three time domain resources. An overlapping part between a first time domain resource and a second time domain resource in a $1^{st}$ first resource set and a $3^{rd}$ first resource set and the DRX active time includes at least first m symbols, and a third time domain resource in the $1^{st}$ first resource set and the $3^{rd}$ first resource set does not overlap with the DRX active time. Three time domain resources in a $2^{nd}$ first resource set do not overlap with the DRX active time. In this case, the second moment may be set to a start point of a first time domain resource, and the third moment may be set to an end point of a third time domain resource in the $2^{nd}$ first resource set (that is, x provided in the third moment is 3 and y is 2). Alternatively, the third moment is following the end point of the third time domain resource in the $2^{nd}$ first resource set. For example, the third moment is a start point of a first time domain resource in the $3^{rd}$ resource set (that is, x provided in the third moment is 1 and y is 3). For another example, the third moment is a start point of a third time domain resource in the $3^{rd}$ first resource set (that is, x and y in the third moment are 3).

In Example 1 in Case 2 in the foregoing embodiment, in Example 1.2, first P time domain resources of N time domain resources in the second resource set in the target period are included in the DRX active time, and N−P time domain resources other than the P time domain resources may overlap or may not overlap with the DRX active time. This is not required. N−P is a positive integer greater than or equal to 1.

In Example 2 in Case 2 in the foregoing embodiment, in Example 2.2, first m symbols of first P time domain resources of the N time domain resources in the second resource set in the target period are included in the active time, and first m symbols of N−P time domain resources other than the P time domain resources may overlap or may not overlap with the active time. This is not required. N–P is a positive integer greater than or equal to 1.

In one case, N–P time domain resources other than the P time domain resources in Example 1.2 overlap with the DRX active time, and an overlapping part includes at least first m symbols of the N–P time domain resources. In another case, in Example 2.2, the first m symbols of N–P time domain resources other than the P time domain resources overlap with the DRX active time.

In the two cases, for any one of first P–1 time domain resources, a duration value may be selected from the duration value set as the first duration value. Alternatively, the first duration value may be determined based on the third moment and the second moment, where x in the third moment is less than or equal to P–1. Because the P–1 time domain resources are aligned with the active time (on duration), corresponding SCI may be detected by the time domain resource itself. In this case, the first duration value may be determined in any manner to receive the data. Certainly, the first duration value may also be determined directly based on the SCI detected for the first time. For example, the first duration value is determined by using the difference between the third moment and the second moment. In an example, the second moment is a start point of the first time domain resource, and the third moment is an end point of an $N^{th}$ time domain resource. All subsequent time domain resources need to trigger the timer based on a $P^{th}$ time domain resource to receive the time domain resource. In the two cases, for the $P^{th}$ time domain resource, a duration value may be selected from the duration value set as the first duration value. The selected duration value is a minimum duration value greater than or equal to the difference between the third moment and the second moment, where x in the third moment is equal to 1 or N. Alternatively, the first duration value may be determined based on the third moment and the second moment, where x in the third moment is equal to 1 or N, and y is equal to F–1. For a process of determining the first duration value based on the third moment and the second moment, refer to the descriptions in the foregoing embodiments. For example, the difference between the third moment and the second moment is determined as the first duration value. For another example, a sum of the difference between the third moment and the second moment plus a first parameter is determined as the first duration value. For still another example, a minimum quantity of slots greater than or equal to the difference between the third moment and the second moment is determined as the first duration value. In an example, in this case, the second moment may be set to a start point of the first time domain resource, the third moment may be set to an end point of an $N^{th}$ time domain resource in a $(F–1)^{th}$ first resource set, and a difference between the start point of the first time domain resource and the end point of the $N^{th}$ time domain resource in the $(F–1)^{th}$ first resource set as the first duration value.

In the foregoing several embodiments, it is considered that x in the third moment is equal to 1 because another time domain resource in any first resource set may be received based on a retransmission timer.

In one case, in Example 1.2, none of N–P time domain resources other than the P time domain resources overlap with the DRX active time, or an overlapping part between the N–P time domain resources and the DRX active time does not include the at least first m symbols of the N–1 time domain resources. In another case, in Example 2.2, the first m symbols of the N–P time domain resources other than the P time domain resources do not overlap with the DRX active time. The two cases may be the same as Example 1.1. To completely receive the $N^{th}$ time domain resource in the first resource set, an end point of the $N^{th}$ time domain resource needs to be in the active time. In this case, the second moment may be set to a start point of the first time domain resource, the third moment may be set to an end point of the $N^{th}$ time domain resource, and a difference between the start point of the first time domain resource and the end point of the $N^{th}$ time domain resource in the $(F–1)^{th}$ first resource set is determined as the first duration value.

In the foregoing embodiment, for a specific difference between the third moment and the second moment, refer to the foregoing descriptions of various start symbols and end symbols. Details are not described again. The examples are merely examples and are not limited thereto.

In this application, in an example, if A<B, a difference between A and B may be obtained by subtracting A from B; or if A>B, a difference between A and B may be obtained by subtracting B from A.

In this application, one or more duration values in the duration value set configured for a resource pool or the duration value set configured for a sidelink may be configured with a length of an associated DRX active time or a DRX cycle length. For example, when the length of the DRX active time is 10 sl, the first duration value is 10 sl, 15 sl, 28 sl, or the like; or when the length of the DRX active time is 20 sl, the first duration value is 20 sl, 25 sl, 30 sl, or the like. When the DRX cycle is 20 sl, the first duration value is 20 sl, 25 sl, 28 sl, or the like. When the DRX cycle is 30 sl, the first duration value is 25 sl, 30 sl, 35 sl, or the like, where sl is short for slot.

When the first terminal, the second terminal, or the network device determines a duration value in the duration value set as the first duration value, the duration value may be determined based on a length of a DRX active time of the first terminal or a DRX cycle length.

The foregoing described method for determining the first duration value by the first terminal based on the DRX active time and/or the time domain resource indicated by the SCI may also be applicable to the second terminal and the network device.

The first terminal may also be a transmit-end terminal, or may be a receive-end terminal.

The foregoing describes the communication method in embodiments of this application, and the following describes a communication apparatus in embodiments of this application. The method and the apparatus are based on a same technical idea. The method and the apparatus have similar principles for resolving problems. Therefore, for implementations of the apparatus and the method, refer to each other, and details of repeated parts are not described again.

Figure 8:
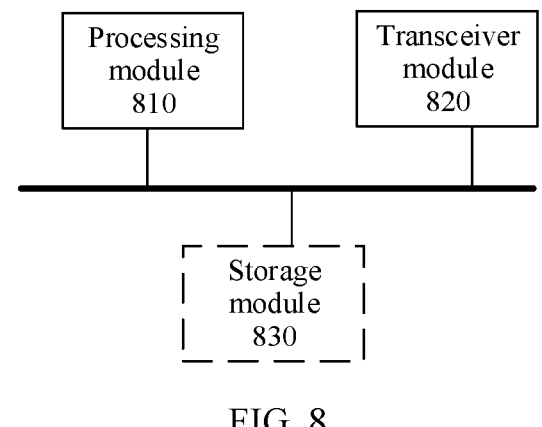
FIG. 8 is a diagram of a structure of a communication apparatus according to an embodiment of this application.

Based on a same technical idea as the foregoing communication method, as shown in FIG. 8, a communication apparatus 800 is provided and configured to implement functions of the terminal or the network device in the foregoing method. The communication apparatus may be a terminal or a network device, an apparatus in a terminal or a network device, or an apparatus that can be used together with a terminal and a network device. The apparatus 800 can perform the steps performed by the first terminal in the method in FIG. 3. The apparatus 800 may be the first terminal, or may be a chip used in the first terminal. The apparatus 800 may alternatively perform the steps performed by the second terminal in FIG. 3. The apparatus 800 may be the second terminal, or may be a chip used in the second terminal. The apparatus 800 may also perform the steps performed by the network device. The apparatus 800 may be the network device, or may be a chip in the network device. In other words, the communication apparatus 800 may be a chip system. In an embodiment of this application, the chip system may include a chip, or may include a chip and another discrete component. The apparatus 800 may include a transceiver module 820 and a processing module 810. Optionally, the apparatus 800 further includes a storage module 830. The processing module 810 may be separately connected to the storage module 830 and the transceiver module 820, or the storage module 830 may be connected to the transceiver module 820. The storage module 830 may include one or more memories. The memory may be a component configured to store a program or data in one or more devices or circuits. The storage module 830 may store computer executable instructions for the method on the first terminal side, so that the processing module 810 performs the method on the first terminal side in the foregoing embodiments. The storage module 830 may be a register, a cache, a RAM, or the like. The storage module 830 may be integrated with the processing module 810. The storage module 830 may be a ROM or another type of static storage device that can store static information and instructions, and the storage module 830 may be independent of the processing module 810. The transceiver module 820 may be an input/output interface, a pin, a circuit, or the like.

For example, when the communication apparatus 800 is configured to perform an operation performed by the first terminal:

In an example, the transceiver module 820 may be configured to receive sidelink control information SCI from a second terminal, where the SCI indicates a sidelink time domain resource. The processing module 810 may be configured to determine a first duration value of a first timer, where the first duration value may belong to a duration value set configured for a resource pool or a duration value set configured for a sidelink, and the duration value set includes at least one duration value. Alternatively, the first duration value may be determined based on discontinuous reception DRX configuration information of the apparatus and/or the sidelink time domain resource indicated by the SC. The processing module 810 may be further configured to start the first timer at a first moment, and monitor sidelink control information and/or sidelink data information in at least one time unit within the first duration value.

In an example, when the processing module 810 is configured to determine the first duration value of the inactivity timer, the processing module 810 may be specifically configured to: determine a duration value in the duration value set as the first duration value; determine the first duration value based on the discontinuous reception configuration information of the apparatus and/or the sidelink time domain resource indicated by the SCI; receive the first duration value from the second terminal by using the transceiver module 820; or receive the first duration value from a network device by using the transceiver module 820.

In an example, when the processing module 810 is configured to determine the first duration value based on the discontinuous reception configuration information of the apparatus and/or the sidelink time domain resource indicated by the SCI, the processing module 810 may be specifically configured to determine the first duration value by at least one of the following: determining the first duration value based on the discontinuous reception configuration information of the apparatus and/or a time domain position of the sidelink time domain resource indicated by the SCI; determining the first duration value based on whether the discontinuous reception configuration information of the apparatus completely overlaps with the sidelink time domain resource indicated by the SCI; or determining the first duration value based on a degree of overlapping between the discontinuous reception configuration information of the apparatus and the sidelink time domain resource indicated by the SCI.

In an example, when the processing module 810 is configured to determine the first duration value based on the discontinuous reception configuration information of the apparatus and/or the sidelink time domain resource indicated by the SCI, the processing module 810 may be specifically configured to determine the first duration value based on discontinuous reception duration of the apparatus and/or the sidelink time domain resource indicated by the SCI.

In an example, when the processing module 810 is configured to determine the first duration value based on the discontinuous reception DRX configuration information of the apparatus and/or the sidelink time domain resource indicated by the SCI, the processing module 810 may be configured to determine the first duration value based on a difference between the third moment and the second moment. The second moment and the third moment have been described in the foregoing method embodiment, and details are not described herein again.

In an example, when the processing module 810 is configured to determine the first duration value based on a difference between the third moment and the second moment, the processing module 810 may be specifically configured to determine the difference between the third moment and the second moment, a sum of the difference between the third moment and the second moment and a first parameter, or a minimum quantity of slots greater than or equal to the difference between the third moment and the second moment as the first duration value. The first parameter is, for example, duration of a time domain resource or an offset.

In an example, when determining a duration value in the duration value set as the first duration value, the processing module 810 may be specifically configured to determine a minimum duration value that is in the duration value set and that is greater than or equal to the difference between the third moment and the second moment as the first duration value.

In an example, when the processing module 810 is configured to determine a duration value in the duration value set as the first duration value, the processing module 810 is specifically configured to determine a minimum duration value that is in the duration value set and that is greater than or equal to the difference between the third moment and the second moment as the first duration value.

In an example, that the apparatus 800 is in an active time in time domain occupied by the time domain resource indicated by the SCI includes: The first timer is timing.

In an example, that the apparatus 800 is in an inactive time in time domain not occupied by the time domain resource indicated by the SCI includes: The first timer pauses timing.

In an example, unicast service transmission or multicast service transmission is performed between the apparatus 800 and the second terminal.

In an example, when the processing module 810 is configured to monitor sidelink control information and/or sidelink data information in at least one time unit within a first duration value of the first timer, the processing module 810 is specifically configured to enable the apparatus 800 to be in the active time in the sidelink time domain resource indicated by the SCI.

In an example, the apparatus 800 is in the active time within the first duration value of the first timer.

In an example, the storage module 830 may store the duration value set, or may store a position of the time domain resource indicated by the SCI, or may store the determined first duration value.

For example, when the communication apparatus 800 performs an operation performed by the second terminal:

In an example, the transceiver module 820 may be configured to send SCI to the first terminal, where the SCI indicates a sidelink time domain resource.

In an example, the transceiver module 820 is specifically configured to send a first duration value to the first terminal. The first duration value may belong to a duration value set configured for a resource pool or a duration value set configured for a sidelink, and the duration value set includes at least one duration value. Alternatively, the first duration value may be determined based on discontinuous reception DRX configuration information of the first terminal and/or a time domain resource indicated by the SCI.

In an example, the processing module 810 may be configured to: determine a duration value in the duration value set as the first duration value; or determine the first duration value based on the discontinuous reception configuration information of the first terminal and/or the time domain resource indicated by the SCI.

In an example, when the processing module 810 is configured to determine the first duration value based on the discontinuous reception configuration information of the first terminal and/or the sidelink time domain resource indicated by the SCI, the processing module 810 may be specifically configured to determine the first duration value by at least one of the following: determining the first duration value based on the discontinuous reception configuration information of the first terminal and/or a time domain position of the sidelink time domain resource indicated by the SCI; determining the first duration value based on whether the discontinuous reception configuration information of the first terminal completely overlaps with the sidelink time domain resource indicated by the SCI; or determining the first duration value based on a degree of overlapping between the discontinuous reception configuration information of the first terminal and the sidelink time domain resource indicated by the SCI.

In an example, when the processing module 810 is configured to determine the first duration value based on the discontinuous reception configuration information of the first terminal and/or the sidelink time domain resource indicated by the SCI, the processing module 810 may be specifically configured to determine the first duration value based on discontinuous reception duration of the first terminal and/or the sidelink time domain resource indicated by the SCI.

In an example, when the processing module 810 is configured to determine the first duration value based on the discontinuous reception DRX configuration information of the first terminal and/or the sidelink time domain resource indicated by the SCI, the processing module 810 may be configured to determine the first duration value based on a difference between the third moment and the second moment. The second moment and the third moment have been described in the foregoing method embodiment, and details are not described herein again.

In an example, when the processing module 810 is configured to determine the first duration value based on a difference between the third moment and the second moment, the processing module 810 may be specifically configured to determine the difference between the third moment and the second moment, a sum of the difference between the third moment and the second moment and a first parameter, or a minimum quantity of slots greater than or equal to the difference between the third moment and the second moment as the first duration value. The first parameter is, for example, duration of a time domain resource or an offset.

In an example, when determining a duration value in the duration value set as the first duration value, the processing module 810 may be specifically configured to determine a minimum duration value that is in the duration value set and that is greater than or equal to the difference between the third moment and the second moment as the first duration value.

For example, when the communication apparatus 800 is configured to perform an operation performed by the network device:

In an example, the transceiver module 820 is specifically configured to send a first duration value to the first terminal. The first duration value may belong to a duration value set configured for a resource pool or a duration value set configured for a sidelink, and the duration value set includes at least one duration value.

In an example, the processing module 810 may be configured to determine a duration value in the duration value set as the first duration value.

Figure 9:
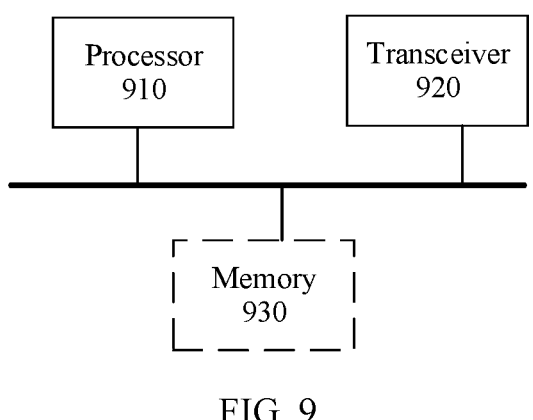
FIG. 9 is a diagram of a structure of another communication apparatus according to an embodiment of this application.

FIG. 9 is a schematic block diagram of a communication apparatus 900 according to an embodiment of this application. It should be understood that the apparatus 900 can perform the steps performed by the first terminal, the second terminal, and the network device in the method in FIG. 3. The apparatus 900 includes a processor 910 and a transceiver 920. Optionally, the apparatus 900 further includes a memory 930. The transceiver may be configured to receive program instructions and transmit the program instructions to the processor, or the transceiver may be configured to perform communication interaction between the apparatus and another communication device, for example, exchange control signaling and/or service data. The transceiver may be code and/or data read/write interface circuit, or the transceiver may be a signal transmission interface circuit between a communication processor and a transceiver. The processor 910 and the memory 930 are electrically coupled.

For example, the memory 930 is configured to store a computer program. The processor 910 may be configured to invoke the computer program or instructions stored in the memory, to perform the foregoing communication method, or perform the foregoing communication method by using the transceiver 920.

In FIG. 8, the processing module 810 may be implemented by using the processor 910, the transceiver module 820 may be implemented by using the transceiver 920, and the storage module 830 may be implemented by using the memory 930.

For example, when the communication apparatus 900 is configured to perform an operation performed by the first terminal:

In an example, the transceiver 920 may be configured to receive sidelink control information SCI from a second terminal, where the SCI indicates a sidelink time domain resource. The processor 910 may be configured to determine a first duration value of a first timer, where the first duration value may belong to a duration value set configured for a resource pool or a duration value set configured for a sidelink, and the duration value set includes at least one duration value. Alternatively, the first duration value may be determined based on discontinuous reception DRX configuration information of the apparatus and/or the sidelink time domain resource indicated by the SC. The processor 910 may be further configured to start the first timer at a first moment, and monitor sidelink control information and/or sidelink data information in at least one time unit within the first duration value.

In an example, when the processor 910 is configured to determine the first duration value of the inactivity timer, the processor 910 may be specifically configured to: determine a duration value in the duration value set as the first duration value; determine the first duration value based on the discontinuous reception configuration information of the apparatus and/or the sidelink time domain resource indicated by the SCI; receive the first duration value from the second terminal by using the transceiver 920; or receive the first duration value from a network device by using the transceiver 920.

In an example, when the processor 910 is configured to determine the first duration value based on the discontinuous reception configuration information of the apparatus and/or the sidelink time domain resource indicated by the SCI, the processor 910 may be specifically configured to determine the first duration value by at least one of the following: determining the first duration value based on the discontinuous reception configuration information of the apparatus and/or a time domain position of the sidelink time domain resource indicated by the SCI; determining the first duration value based on whether the discontinuous reception configuration information of the apparatus completely overlaps with the sidelink time domain resource indicated by the SCI; or determining the first duration value based on a degree of overlapping between the discontinuous reception configuration information of the apparatus and the sidelink time domain resource indicated by the SCI.

In an example, when the processor 910 is configured to determine the first duration value based on the discontinuous reception configuration information of the apparatus and/or the sidelink time domain resource indicated by the SCI, the processor 910 may be specifically configured to determine the first duration value based on discontinuous reception duration of the apparatus and/or the sidelink time domain resource indicated by the SCI.

In an example, when the processor 910 is configured to determine the first duration value based on the discontinuous reception DRX configuration information of the apparatus and/or the sidelink time domain resource indicated by the SCI, the processor 910 may be configured to determine the first duration value based on a difference between the third moment and the second moment. The second moment and the third moment have been described in the foregoing method embodiment, and details are not described herein again.

In an example, when the processor 910 is configured to determine the first duration value based on a difference between the third moment and the second moment, the processor 910 may be specifically configured to determine the difference between the third moment and the second moment, a sum of the difference between the third moment and the second moment and a first parameter, or a minimum quantity of slots greater than or equal to the difference between the third moment and the second moment as the first duration value. The first parameter is, for example, duration of a time domain resource or an offset.

In an example, when determining a duration value in the duration value set as the first duration value, the processor 910 may be specifically configured to determine a minimum duration value that is in the duration value set and that is greater than or equal to the difference between the third moment and the second moment as the first duration value.

In an example, when the processor 910 is configured to determine a duration value in the duration value set as the first duration value, the processor 910 is specifically configured to determine a minimum duration value that is in the duration value set and that is greater than or equal to the difference between the third moment and the second moment as the first duration value.

In an example, that the apparatus 900 is in an active time in time domain occupied by the time domain resource indicated by the SCI includes: The first timer is timing.

In an example, that the apparatus 900 is in an inactive time in time domain not occupied by the time domain resource indicated by the SCI includes: The first timer pauses timing.

In an example, unicast service transmission or multicast service transmission is performed between the apparatus 900 and the second terminal.

In an example, when the processor 910 is configured to monitor sidelink control information and/or sidelink data information in at least one time unit within a first duration value of the first timer, the processor 910 is specifically configured to enable the apparatus 900 to be in the active time in the sidelink time domain resource indicated by the SCI.

In an example, the apparatus 900 is in the active time within the first duration value of the first timer.

In an example, the memory 930 may store the duration value set, or may store a position of the time domain resource indicated by the SCI, or may store the determined first duration value.

For example, when the communication apparatus 900 performs an operation performed by the second terminal:

In an example, the transceiver 920 may be configured to send SCI to the first terminal, where the SCI indicates a sidelink time domain resource.

In an example, the transceiver 920 is specifically configured to send a first duration value to the first terminal. The first duration value may belong to a duration value set configured for a resource pool or a duration value set configured for a sidelink, and the duration value set includes at least one duration value. Alternatively, the first duration value may be determined based on discontinuous reception DRX configuration information of the first terminal and/or a time domain resource indicated by the SCI.

In an example, the processor 910 may be configured to: determine a duration value in the duration value set as the first duration value; or determine the first duration value based on the discontinuous reception configuration information of the first terminal and/or the time domain resource indicated by the SCI.

In an example, when the processor 910 is configured to determine the first duration value based on the discontinuous reception configuration information of the first terminal and/or the sidelink time domain resource indicated by the SCI, the processor 910 may be specifically configured to determine the first duration value by at least one of the following: determining the first duration value based on the discontinuous reception configuration information of the first terminal and/or a time domain position of the sidelink time domain resource indicated by the SCI; determining the first duration value based on whether the discontinuous reception configuration information of the first terminal completely overlaps with the sidelink time domain resource indicated by the SCI; or determining the first duration value based on a degree of overlapping between the discontinuous reception configuration information of the first terminal and the sidelink time domain resource indicated by the SCI.

In an example, when the processor 910 is configured to determine the first duration value based on the discontinuous reception configuration information of the first terminal and/or the sidelink time domain resource indicated by the SCI, the processor 910 may be specifically configured to determine the first duration value based on discontinuous reception duration of the first terminal and/or the sidelink time domain resource indicated by the SCI.

In an example, when the processor 910 is configured to determine the first duration value based on the discontinuous reception DRX configuration information of the first terminal and/or the sidelink time domain resource indicated by the SCI, the processor 910 may be configured to determine the first duration value based on a difference between the third moment and the second moment. The second moment and the third moment have been described in the foregoing method embodiment, and details are not described herein again.

In an example, when the processor 910 is configured to determine the first duration value based on a difference between the third moment and the second moment, the processor 910 may be specifically configured to determine the difference between the third moment and the second moment, a sum of the difference between the third moment and the second moment and a first parameter, or a minimum quantity of slots greater than or equal to the difference between the third moment and the second moment as the first duration value. The first parameter is, for example, duration of a time domain resource or an offset.

In an example, when determining a duration value in the duration value set as the first duration value, the processor 910 may be specifically configured to determine a minimum duration value that is in the duration value set and that is greater than or equal to the difference between the third moment and the second moment as the first duration value.

For example, when the communication apparatus 900 is configured to perform an operation performed by the network device:

In an example, the transceiver 920 is specifically configured to send a first duration value to the first terminal. The first duration value may belong to a duration value set configured for a resource pool or a duration value set configured for a sidelink, and the duration value set includes at least one duration value.

In an example, the processor 910 may be configured to determine a duration value in the duration value set as the first duration value.

The foregoing processor may be a central processing unit (CPU), a network processor (NP), or a combination of the CPU and the NP. The processor may further include a hardware chip or another general-purpose processor. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or the like, or any combination thereof. The general-purpose processor may be a microprocessor, any conventional processor, or the like.

It may be understood that the memory mentioned in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. Through example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in this application is intended to include but is not limited to these memories and any memory of another proper type.

The transceiver apparatus, the interface circuit, or the transceiver in embodiments of this application may include a separate transmitter and/or a separate receiver, or the transmitter and the receiver may be integrated. The transceiver apparatus, the interface circuit, or the transceiver may work under an indication of a corresponding processor. Optionally, the transmitter may be corresponding to a transmitter in a physical device, and the receiver may be corresponding to a receiver in a physical device.

An embodiment of this application further provides a computer-readable storage medium that stores a computer program. When the computer program is executed by a computer, the computer may be enabled to perform the foregoing communication method. For example, the method shown in FIG. 3 is performed.

An embodiment of this application further provides a computer program product including instructions. When the computer program product runs on a computer, the computer may be enabled to perform the communication method provided above. For example, the method shown in FIG. 3 is performed.

An embodiment of this application further provides a communication system. The communication system includes a first terminal and a second terminal that perform the foregoing communication method. Optionally, the communication system further includes the network device in the foregoing communication method.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flow-charts and/or block diagrams of the method, the device (system), and the computer program product according to the embodiments of this application. It should be understood that computer program instructions may be used to imple-ment each process and/or each block in the flowcharts and/or the block diagrams and a combination of a process and/or a block in the flowcharts and/or the block diagrams. These computer program instructions may be provided for a gen-eral-purpose computer, a dedicated computer, an embedded processor, or a processor of any other programmable data processing device to generate a machine, so that the instruc-tions executed by a computer or a processor of any other programmable data processing device generate an apparatus for implementing a specific function in one or more pro-cesses in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus imple-ments a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is gener-ated. Therefore, the instructions executed on the computer or the another programmable device provide steps for imple-menting a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodi-ments and all changes and modifications falling within the scope of this application.

Clearly, persons skilled in the art can make various modifications and variations to embodiments of this appli-cation without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A communication method comprising:
receiving, by a first terminal, sidelink control information (SCI) from a second terminal, wherein the SCI indi-cates a reserved sidelink time domain resource; and
starting or restarting, by the first terminal, a first timer at a first moment, and monitoring sidelink control infor-mation and/or sidelink data information within a first duration of the first timer,
wherein the SCI comprises first-level SCI and second-level SCI,
wherein the first moment is a next slot after a slot in which the first-level SCI and the second-level SCI are located,
wherein the reserved time domain resource indicated by the SCI includes a second resource set, wherein the reserved time domain resource is a periodic resource,
wherein the second resource set includes a periodic first resource set, and
wherein the periodic first resource set includes N time domain resources, where N is an integer greater than or equal to 1.

2. The method according to claim 1, wherein the first duration belongs to a duration set configured for a resource pool or a duration set configured for a sidelink, and the duration set comprises at least one duration;
wherein the first duration is determined based on discon-tinuous reception (DRX) configuration information of the first terminal and/or the sidelink time domain resource indicated by the SCI; and
wherein the first duration is received from a network device or from the second terminal.

3. The method according to claim 1, wherein the first terminal is in an active time in a time domain occupied by the reserved time domain resource indicated by the SCI,
and wherein sidelink control information and/or sidelink data information needs to be monitored by the first terminal within the active time.

4. The method according to claim 1, wherein the N time domain resources are used to transmit a same data packet or a same transport block.

5. The method according to claim 1, wherein the reserved time domain resource in different periods are used to trans-mit different transport blocks.

6. The method according to claim 1, further comprising sending, by the second terminal, the SCI, wherein the SCI indicates the sidelink time domain resource.

7. A communication apparatus comprising at least one processor, and a memory storing instructions for execution by the at least one processor, wherein, when executed, the instructions cause the communications apparatus to perform operations comprising:
receiving sidelink control information (SCI) from a sec-ond terminal, wherein the SCI indicates a reserved sidelink time domain resource; and
starting or restarting a first timer at a first moment, and monitoring sidelink control information and/or sidelink data information within a first duration of the first timer,
wherein the SCI comprises first-level SCI and second-level SCI,
wherein the first moment is a next slot after a slot in which the first-level SCI and the second-level SCI are located,
wherein the reserved time domain resource is a periodic resource,
wherein the reserved time domain resource indicated by the SCI includes a second resource set,
wherein the second resource set includes a periodic first resource set, and
wherein the periodic first resource set includes N time domain resources, where N is an integer greater than or equal to 1.

8. The communication apparatus according to claim 7, wherein
the first duration belongs to a duration set configured for a resource pool or a duration set configured for a sidelink, and the duration set comprises at least one duration;
the first duration is determined based on discontinuous reception (DRX) configuration information of the com-munication apparatus and/or the sidelink time domain resource indicated by the SCI;

the first duration is received from a network device; or
the first duration is received from the second terminal.

9. The communication apparatus according to claim 7, wherein the communication apparatus is in an active time in time domain occupied by the reserved time domain resource indicated by the SCI, and wherein sidelink control information and/or sidelink data information needs to be monitored by the communication apparatus within the active time.

10. The communication apparatus according to claim 7, wherein the N time domain resources are used to transmit a same data packet or a same transport block.

11. The communication apparatus according to claim 7, wherein the reserved time domain resource in different periods are used to transmit different transport blocks.

12. A non-transitory computer readable storage medium, storing at least one instruction, which when executed by at least one processor, causes a communication apparatus comprising the at least one processor to:

receive sidelink control information (SCI) from a second terminal, wherein the SCI indicates a reserved sidelink time domain resource; and start or restart a first timer at a first moment, and monitor sidelink control information and/or sidelink data information within a first duration of the first timer, wherein the SCI comprises first-level SCI and second-level SCI, wherein the first moment is a next slot after a slot in which the first-level SCI and the second-level SCI are located, wherein the reserved time domain resource is a periodic resource, wherein the reserved time domain resource indicated by the SCI includes a second resource set, wherein the second resource set includes a periodic first resource set, and wherein the periodic first resource set includes N time domain resources, where N is an integer greater than or equal to 1.

13. The non-transitory computer readable storage medium according to claim 12, wherein the first duration belongs to a duration set configured for a resource pool or a duration set configured for a sidelink, and the duration set comprises at least one duration;

the first duration is determined based on discontinuous reception (DRX) configuration information of the communication apparatus and/or the sidelink time domain resource indicated by the SCI;

the first duration is received from a network device; or the first duration is received from the second terminal.

14. The non-transitory computer readable storage medium according to claim 12, wherein the communication apparatus is in an active time in a time domain occupied by the reserved time domain resource indicated by the SCI, and wherein sidelink control information and/or sidelink data information needs to be monitored by the communication apparatus within the active time.

15. The non-transitory computer readable storage medium according to claim 12, wherein the N time domain resources are used to transmit a same data packet or a same transport block.

16. The non-transitory computer readable storage medium according to claim 12, wherein the reserved time domain resource in different periods are used to transmit different transport blocks.

* * * * *